US012741206B2

(12) United States Patent
Galpin et al.

(10) Patent No.: US 12,741,206 B2
(45) Date of Patent: Sep. 22, 2026

(54) LATENCY MANAGEMENT WITH DEEP LEARNING BASED PREDICTION IN GAMING APPLICATIONS

(71) Applicant: INTERDIGITAL MADISON PATENT HOLDINGS, SAS, Paris (FR)

(72) Inventors: Franck Galpin, Thorigne-Fouillard (FR); Philippe Bordes, Laille (FR); Fabrice Le Leannec, Betton (FR); Karam Naser, Mouazé (FR); Louis Chevallier, La Mézière (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 626 days.

(21) Appl. No.: 18/030,860

(22) PCT Filed: Sep. 30, 2021

(86) PCT No.: PCT/EP2021/076914

§ 371 (c)(1),
(2) Date: Apr. 7, 2023

(87) PCT Pub. No.: WO2022/073840

PCT Pub. Date: Apr. 14, 2022

(65) Prior Publication Data

US 2023/0372814 A1 Nov. 23, 2023

(30) Foreign Application Priority Data

Oct. 9, 2020 (EP) .................................... 20306182
Oct. 9, 2020 (EP) .................................... 20306183

(51) Int. Cl.
*A63F 13/358* (2014.01)
*A63F 13/355* (2014.01)
(Continued)

(52) U.S. Cl.
CPC .......... *A63F 13/358* (2014.09); *A63F 13/355* (2014.09); *A63F 13/67* (2014.09);
(Continued)

(58) Field of Classification Search
CPC ...... A63F 13/358; A63F 13/355; A63F 13/67; H04N 19/46; H04N 19/503; G06N 3/08
See application file for complete search history.

(56) References Cited

U.S. PATENT DOCUMENTS 10,306,180 B2 5/2019 Mcloughlin et al.
10,419,737 B2 * 9/2019 Pang ..................... H04N 23/45
(Continued)

OTHER PUBLICATIONS

Bross et al., "Versatile video coding (draft 9)", Joint Video Experts Team (JVET) of ITU-T SG 16 WP 3 and ISO/IEC JTC 1/SC 29/WG 11, Document: JVET-R2001-vA, 18th Meeting, by teleconference, Apr. 15, 2020, 524 pages.
(Continued)

*Primary Examiner* — Ankit B Doshi
(74) *Attorney, Agent, or Firm* — VOLPE KOENIG

(57) ABSTRACT

A method for reducing a latency in a gaming application comprising: obtaining (305B) a first frame, said first frame being representative of a first action performed by a user in the gaming application; obtaining (500) information representative of a second action performed by the user in the gaming application, said second action following the first action; and, predicting (500) a second frame corresponding to the second action from data comprising at least the first frame and the information representative of a second action using a neural network.

20 Claims, 9 Drawing Sheets

(51) Int. Cl.
*A63F 13/67* (2014.01)
*G06N 3/08* (2023.01)
*H04N 19/46* (2014.01)
*H04N 19/503* (2014.01)

(52) U.S. Cl.
CPC ............... *G06N 3/08* (2013.01); *H04N 19/46* (2014.11); *H04N 19/503* (2014.11)

(56) References Cited

U.S. PATENT DOCUMENTS

| | | | | |
|---|---|---|---|---|
| 2018/0115743 | A1* | 4/2018 | McLoughlin | A63F 13/00 |
| 2020/0084255 | A1 | 3/2020 | Mcloughlin et al. | |
| 2020/0252682 | A1* | 8/2020 | Walker | H04N 21/251 |
| 2020/0306632 | A1* | 10/2020 | Kolen | A63F 13/79 |
| 2021/0329340 | A1* | 10/2021 | Jeon | H04N 19/172 |

OTHER PUBLICATIONS

Anonymous, "Versatile Video Coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.266, Aug. 2020, 516 pages.

Anonymous, "Information technology—Coding of audio-visual objects—Part 10: Advanced Video Coding", International Organization for Standardization (ISO), International Standard ISO/IEC 14496-10, Second Edition, Oct. 1, 2004, 280 pages.

Babaeizadeh et al., "Stochastic Variational Video Prediction", 6th International Conference on Learning Representations, ICLR 2018 Conference Blind Submission, Feb. 15, 2018, Vancouver, BC, Canada, 15 pages.

Beeler et al., "Asynchronous Spacewarp", Meta Quest Developer Center, Oculus Developer Blog, Nov. 10, 2016, URL: https://developer.oculus.com/blog/asynchronous-spacewarp, 7 pages.

Anonymous, "Information technology—General video coding—Part 1: Essential video coding", International Organization for Standardization (ISO), Coding of audio, picture, multimedia and hypermedia information, ISO/IEC JTC 1/SC 29, Document: ISO/IEC FDIS 23094-1, Oct. 2020, 351 pages.

Rivaz et al., "AV1 Bitstream & Decoding Process Specification", The Alliance for Open Media, AOMedia, Version 1.0.0 with Errata 1, Jan. 8, 2019, 681 pages.

Finn et al., "Unsupervised Learning for Physical Interaction through Video Prediction", Proceedings of the 30th International Conference on Neural Information Processing Systems (NIPS), Oct. 17, 2016, 12 pages.

Rivaz et al., "AV1 Bitstream & Decoding Process Specification", The Alliance for Open Media, AOMedia, Version 1.0.0, Jun. 25, 2018, 677 pages.

Anonymous, "Information Technology—High efficiency Coding and Media Delivery in Heterogeneous Environments—Part 2: High Efficiency Video Coding", International Organization for Standardization, ISO/IEC JTC 1/SC 29/WG 11, ISO/IEC DIS 23008-2:201x(E), 4th Edition, Apr. 20, 2018, 874 pages.

* cited by examiner

LATENCY MANAGEMENT WITH DEEP LEARNING BASED PREDICTION IN GAMING APPLICATIONS

CROSS REFERENCE TO RELATED APPLICATIONS

This application is a U.S. National Stage Application under 35 U.S.C. § 371 of International Patent Application No. PCT/EP2021/076914, filed Sep. 30, 2021, which is incorporated herein by reference in its entirety.

This application claims priority to European Application Nos. (i) 20306182.5, filed Oct. 9, 2020, and (ii) 20306183.3, filed Oct. 9, 2020; each of which is incorporated herein by reference in its entirety.

1. TECHNICAL FIELD

At least one of the present embodiments generally relates to a method and an apparatus for reducing the latency in gaming applications.

2. BACKGROUND

Cloud gaming allows for partly offloading a game rendering process to some remote game servers situated in a cloud.

FIG. 1 represents schematically a cloud gaming infrastructure. Basically, a game engine 10 and a 3D graphics rendering 11, which require costly and power consuming devices, are implemented by a server 1 in the cloud. Generated frames are then classically encoded in a video stream with a regular video encoder 12 and sent to a user game system 2 via a network 3. The video stream is then decoded on the user game system 2 side with a regular/standard video decoder 20 for rendering on a display device. An additional lightweight module 21 is in charge of managing the gamer interaction commands (i.e. of registering user actions).

One key factor for user comfort in gaming applications is a latency called motion-to-photon, i.e. the latency between a user action (motion) and the display of the results of this action on the display device (photon).

FIG. 2 describes schematically a typical motion-to-photon path in a traditional gaming application.

The steps described in relation to FIG. 2 are all implemented by a user game system, such as a PC or a console. We suppose here that the user game system comprises an input device (such as a joypad) and a display device.

In a step 200, a user action is registered by the input device and sent to a main processing module.

In a step 202, the registered action is used by a game engine to compute a next game state (or next game states). A game state includes a user state (position, etc.), as well as all other entities states which can be either computed by the game engine or external state in case of multi-players games.

In a step 203, from the game state, a frame rendering is computed. The resulting frame is first placed in a video buffer in a step 206 and the content of the video buffer is then displayed on a display device in a step 207.

Each of the above steps introduces a processing latency. In FIG. 2, boxes with a dotted background represents steps introducing a latency due to hardware computations. In general, this latency is fixed, small and cannot be changed easily. Boxes with a white background, represent steps introducing a latency due to software computations. In general, this latency is longer and can be adapted dynamically.

In total, the motion-to-photon latency is usually lower than "100" ms. Typically, user discomfort starts when latency is higher than "200" ms. Note that for games based on virtual reality using a headset visualization, a lower latency is usually needed for a good user comfort.

FIG. 3 describes schematically a typical motion-to-photon path in a cloud gaming application.

The steps described in relation to FIG. 3 are no more implemented by a single device but, as represented in FIG. 1, requires the collaboration between a server 1 and a user game system 2 (i.e. a client system).

Step 200 is executed by the user game system 2.

In a step 301, information representative of the user action is transmitted to the server 1 via the network 3.

The game engine 202 and rendering 203 steps are implemented by the server 1.

The rendering is followed by a video encoding by the video encoder 12 in a step 304.

The video stream generated by the video encoder 12 is then transmitted to the user game system 2 via the network 3 in a step 305 and decoded by the video decoder 20 in a step 306.

Comparing to the process of FIG. 2, additional latencies are introduced:

- Transmission latency. The transmission latency depends on a connection quality of the network. This latency can range from few ms to few "100" ms.
- Encoder latency: in such framework, the encoder is typically used in low-delay configuration, i.e. as soon as a frame arrives, it is encoded and sent in the video stream. A real-time video encoder usually encodes a frame in few ms, a fortiori, when this video encoder is implemented in hardware.
- Decoder latency: a typical video decoder can decode a frame in few ms.

As can be seen, the additional latencies (in particular the transmission latency) can potentially increase the global latency such that said global latency becomes unacceptable for the user. Moreover, the latency variance also increases due to the network conditions changes.

It is desirable to propose solutions allowing to overcome the above issues. In particular, it is desirable to propose a method and an apparatus allowing reducing the latency in gaming applications.

3. BRIEF SUMMARY

In a first aspect, one or more of the present embodiments provide a method for reducing a latency in a gaming application comprising: obtaining a first frame, said first frame being representative of a first action performed by a user in the gaming application; obtaining information representative of a second action performed by the user in the gaming application, said second action following the first action; and, predicting a second frame corresponding to the second action from data comprising at least the first frame and the information representative of a second action using a neural network.

Thanks to this method, the latency is reduced.

In an embodiment, the method further comprises displaying the second frame.

In an embodiment, the method further comprises obtaining metadata along with the first frame, said metadata being at least representative of a status of the game at a time corresponding to the first action and/or of the first action, the second frame being further predicted from the metadata using the neural network.

In an embodiment, the metadata representative of a status of the game comprise information representative of the user and/or information representative of dynamic objects and/or of other users in the game.

In an embodiment, the neural network use parameters: trained offline using data representative of frames, user actions and status of the game collected during an offline execution of the game application; or, trained on the fly using data representative of frames, user actions and status of the game collected during a current execution of the game application; or, initialized at a start of an execution of the game application using parameters trained offline using data representative of frames, user actions and status of the game collected during an offline execution of the game application and then trained on the fly using data representative of frames, user actions and status of the game collected during the current execution of the game application.

In an embodiment, the training of the parameters of the neural network takes into account a time difference between an occurrence of the first action and the obtaining of the first frame.

In an embodiment, when the parameters of the neural network are trained offline, a plurality of sets of parameters are trained, each set of parameters being trained for a different value of time difference, called offline time difference, and wherein, during a current execution of the game application, the method comprises selecting the set of parameters of the plurality corresponding to the offline time difference the closest to an information representative of an actual time difference.

In an embodiment, the training of the parameters of the neural network uses a loss function estimating a difference between the second frame corresponding to the second action predicted by the neural network and a real frame generated by the game application corresponding to the same second action and wherein only a subpart, called displayed part, of the second frame is displayed, only the displayed part being considered by the loss function.

In an embodiment, the gaming application is a network-based gaming application wherein a game is managed by a server communicating with a client system via a network, the method being executed by the client system wherein:

the first action is performed by the user at a first time and registered by the client system and an information representative of the first action is transmitted to the server; and; the first frame and/or the metadata are obtained by decoding a portion of a video stream received from the server.

In an embodiment, the portion of the video stream comprises metadata representative of the first action associated with the first frame.

In an embodiment, metadata representative of the first action are representative of a time at which the first action was executed.

In an embodiment, the metadata comprises the information representative of an actual time difference.

In an embodiment, the metadata are conveyed by a SEI message.

In an embodiment, the first frame corresponds to a second action of the user at a second time following the first time predicted by the server from the information representative of the first action and information representative of a status of the game application at the first time; and the method further comprises: storing a reconstructed version of the first frame in a frame buffer used for temporal prediction of next frames; receiving from the server a frame, called real frame, corresponding to the second time after transmission to the server of data representative of an action performed by the user at the second time; and, decoding the real frame and replacing the reconstructed version of the predicted frame by a reconstructed version of the real frame in the frame buffer.

In a second aspect, one or more of the present embodiments provide a method for reducing a latency in a gaming application comprising: receiving, from a client system, an information representative of a first action performed by a user at a first time in the gaming application; predicting a second action corresponding to a second time following the first time from the information representative of a first action and information representative of a status of the game application at the first time; generating a frame, called predicted frame, corresponding to said second action; encoding said predicted frame and storing a reconstructed version of the predicted frame in a frame buffer used for temporal prediction of next frames; transmitting the encoded predicted frame to the client system; generating a frame, called real frame, corresponding to the second time when data representative of an action performed by the user at the second time are received; and, encoding the real frame and replacing the reconstructed version of the predicted frame by a reconstructed version of the real frame in the frame buffer.

In a third aspect, one or more of the present embodiments provide a device for reducing a latency in a gaming application comprising electronic circuitry adapted for: obtaining a first frame, said first frame being representative of a first action performed by a user in the gaming application; obtaining information representative of a second action performed by the user in the gaming application, said second action following the first action; and, predicting a second frame corresponding to the second action from data comprising at least the first frame and the information representative of a second action using a neural network.

In an embodiment, the electronic circuitry is further adapted for controlling a display of the second frame.

In an embodiment, the electronic circuitry is further adapted for obtaining metadata along with the first frame, said metadata being at least representative of a status of the game at a time corresponding to the first action and/or of the first action, the second frame being further predicted from the metadata using the neural network.

In an embodiment, the metadata representative of a status of the game comprise information representative of the user and/or information representative of dynamic objects and/or of other users in the game.

In an embodiment, the neural network use parameters: trained offline using data representative of frames, user actions and status of the game collected during an offline execution of the game application; or, trained on the fly using data representative of frames, user actions and status of the game collected during a current execution of the game application; or, initialized at a start of an execution of the game application using parameters trained offline using data representative of frames, user actions and status of the game collected during an offline execution of the game application and then trained on the fly using data representative of frames, user actions and status of the game collected during the current execution of the game application.

In an embodiment, the training of the parameters of the neural network takes into account a time difference between an occurrence of the first action and the obtaining of the first frame.

In an embodiment, when the parameters of the neural network are trained offline, a plurality of sets of parameters are trained, each set of parameters being trained for a different value of time difference, called offline time difference, and wherein, during a current execution of the game application, the electronic circuitry is further adapted for selecting the set of parameters of the plurality corresponding to the offline time difference the closest to an information representative of an actual time difference.

In an embodiment, the training of the parameters of the neural network uses a loss function estimating a difference between the second frame corresponding to the second action predicted by the neural network and a real frame generated by the game application corresponding to the same second action and wherein only a subpart, called displayed part, of the second frame is displayed, only the displayed part being considered by the loss function.

In an embodiment, the gaming application is a network-based gaming application wherein a game is managed by a server communicating with a device via a network, the electronic circuitry being further adapted to: register a the first action, said first action being performed by a user at a first time; transmit information representative of the first action to the server; and; obtain the first frame and/or the metadata by decoding a portion of a video stream received from the server.

In an embodiment, the portion of the video stream comprises metadata representative of the first action associated with the first frame.

In an embodiment, the metadata representative of the first action are representative of a time at which the first action was executed.

In an embodiment, the metadata comprise the information representative of an actual time difference.

In an embodiment, the metadata are conveyed by a SEI message.

In an embodiment, the first frame corresponds to a second action of the user at a second time following the first time predicted by the server from the information representative of the first action and information representative of a status of the game application at the first time; and the electronic circuitry is further adapted for: storing a reconstructed version of the first frame in a frame buffer used for temporal prediction of next frames; receiving from the server a frame, called real frame, corresponding to the second time after transmission to the server of data representative of an action performed by the user at the second time; and, decoding the real frame and replacing the reconstructed version of the predicted frame by a reconstructed version of the real frame in the frame buffer.

In a fourth aspect, one or more of the present embodiments provide a device for reducing a latency in a gaming application comprising electronic circuitry adapted for: receiving, from a client system, an information representative of a first action performed by a user at a first time in the gaming application; predicting a second action corresponding to a second time following the first time from the information representative of a first action and information representative of a status of the game application at the first time; generating a frame, called predicted frame, corresponding to said second action; encoding said predicted frame and storing a reconstructed version of the predicted frame in a frame buffer used for temporal prediction of next frames; transmitting the encoded predicted frame to the client system; generating a frame, called real frame, corresponding to the second time when data representative of an action performed by the user at the second time are received; and, encoding the real frame and replacing the reconstructed version of the predicted frame by a reconstructed version of the real frame in the frame buffer.

In a fifth aspect, one or more of the present embodiments provide an apparatus comprising a device according to the third or the fourth aspect.

In a sixth aspect, one or more of the present embodiments provide a system comprising a client system comprising a device according to the third aspect and a server comprising a device according to the fourth aspect.

In a seventh aspect, one or more of the present embodiments provide signal generated by the method of the second aspect or by the device of the fourth aspect.

In a eighth aspect, one or more of the present embodiments provide a computer program comprising program code instructions for implementing the method according to the first or the second aspect.

In a ninth aspect, one or more of the present embodiments provide a non-transitory information storage medium storing program code instructions for implementing the method according to the first or the second aspect.

In a tenth aspect, one or more of the present embodiments provide a method for reducing a latency in a gaming application comprising:

- receiving, from a client system, an information representative of a first action performed by a user at a first time in the gaming application;
- predicting a second action corresponding to a second time following the first time from the information representative of a first action and information representative of a status of the game application at the first time;
- generating a frame, called predicted frame, corresponding to said second action;
- encoding said predicted frame and storing a reconstructed version of the predicted frame in a frame buffer used for temporal prediction of next frames if said predicted frame can be used as a reference frame;
- transmitting the encoded predicted frame to the client system;
- generating a frame, called real frame, corresponding to the second time when data representative of an action performed by the user at the second time are received; and,
- encoding the real frame and storing a reconstructed version of the real frame in the frame buffer in place of the reconstructed version of the predicted frame.

In an embodiment, a syntax element associated to the encoded predicted frame signals that temporal prediction from said predicted frame is not allowed.

In an embodiment, the encoded real frame is transmitted to the client system.

In an embodiment, a syntax element associated to the encoded real frame signals that a display of this real frame is not allowed.

In an embodiment, the method further comprises re-encoding at least one predicted frame following the real frame using the frame buffer for temporal prediction after the storage of said real frame in the frame buffer.

In an embodiment, each encoded frame is associated to a syntax element indicating if said frame is a real frame or a predicted frame.

In an embodiment, frames are encoded using a multi-layer video encoder, real frames being encoded in a first layer and predicted frame being encoded in at least one second layer.

In an embodiment, each encoded frame is associated to a syntax element authorizing a real frame and a predicted frame corresponding to a same time to use a same frame identifier representing an order of decoding of the frame.

In a eleventh aspect, one or more of the present embodiments provide a method for reducing a latency in a gaming application comprising:

- transmitting to a server an information representative of a first action performed by a user at a first time in the gaming application;
- receiving from the server a frame, called predicted frame, corresponding to a second action of the user at a second time following the first time, said second action having been predicted by the server from the information representative of the first action and information representative of a status of the game application at the first time;
- decoding said predicted frame and storing a reconstructed version of the predicted frame in a frame buffer used for temporal prediction of next frames if the predicted frame can be used for temporal prediction;
- receiving from the server a frame, called real frame, corresponding to the second time after transmission to the server of data representative of an action performed by the user at the second time; and,
- decoding the real frame and storing a reconstructed version of the real frame in the frame buffer in place of the reconstructed version of the predicted frame.

In an embodiment, a syntax element associated to the encoded predicted frame signals that temporal prediction from said predicted frame is not allowed.

In an embodiment, a syntax element associated to the encoded real frame signals that a display of this real frame is not allowed.

In an embodiment, the method further comprises receiving a new version of at least one predicted frame stored in the frame buffer, said new version corresponding to a reencoding of said predicted frame using a frame buffer in which at least one preceding predicted frame has been replaced by a corresponding real frame, and replacing the reconstructed version of the predicted frame stored in the frame buffer by the new version.

In an embodiment, each encoded frame is associated to a syntax element indicating if said frame is a real frame or a predicted frame.

In an embodiment, real frames form a first layer of a multi-layer video encoding and predicted frames form at least one second layer of the multi-layer video encoding.

In an embodiment, each encoded frame is associated to a syntax element authorizing a real frame and a predicted frame corresponding to a same time to use a same frame identifier representing an order of decoding of the frame.

In an embodiment, the method comprises:

- obtaining information representative of a third action actually performed by the user at the second time in the gaming application;
- predicting a frame, called final frame, corresponding to the third action from data comprising at least the predicted frame corresponding to the second action and the information representative of the third action using a neural network.

In an embodiment, the predicted frame or the final frame is displayed.

In a twelfth aspect, one or more of the present embodiments provide a device for reducing a latency in a gaming application comprising electronic circuitry adapted for:

- receiving, from a client system, an information representative of a first action performed by a user at a first time in the gaming application;
- predicting a second action corresponding to a second time following the first time from the information representative of a first action and information representative of a status of the game application at the first time;
- generating a frame, called predicted frame, corresponding to said second action;
- encoding said predicted frame and storing a reconstructed version of the predicted frame in a frame buffer used for temporal prediction of next frames if said predicted frame can be used as a reference frame;
- transmitting the encoded predicted frame to the client system;
- generating a frame, called real frame, corresponding to the second time when data representative of an action performed by the user at the second time are received; and,
- encoding the real frame and storing a reconstructed version of the real frame in the frame buffer in place of the reconstructed version of the predicted frame.

In an embodiment, a syntax element associated to the encoded predicted frame signals that temporal prediction from said predicted frame is not allowed.

In an embodiment, the encoded real frame is transmitted to the client system.

In an embodiment, a syntax element associated to the encoded real frame signals that a display of this real frame is not allowed.

In an embodiment, the electronic circuitry is further adapted re-encoding at least one predicted frame following the real frame using the frame buffer for temporal prediction after the storage of said real frame in the frame buffer.

In an embodiment, each encoded frame is associated to a syntax element indicating if said frame is a real frame or a predicted frame.

In an embodiment, frames are encoded using a multi-layer video encoder, real frames being encoded in a first layer and predicted frame being encoded in at least one second layer.

In an embodiment, each encoded frame is associated to a syntax element authorizing a real frame and a predicted frame corresponding to a same time to use a same frame identifier representing an order of decoding of the frame.

In a thirteenth aspect, one or more of the present embodiments provide a device for reducing a latency in a gaming application comprising electronic circuitry adapted for:

- transmitting to a server an information representative of a first action performed by a user at a first time in the gaming application;
- receiving from the server a frame, called predicted frame, corresponding to a second action of the user at a second time following the first time, said second action having been predicted by the server from the information representative of the first action and information representative of a status of the game application at the first time;
- decoding said predicted frame and storing a reconstructed version of the predicted frame in a frame buffer used for temporal prediction of next frames if the predicted frame can be used for temporal prediction;
- receiving from the server a frame, called real frame, corresponding to the second time after transmission to the server of data representative of an action performed by the user at the second time; and,
- decoding the real frame and storing a reconstructed version of the real frame in the frame buffer in place of the reconstructed version of the predicted frame.

In an embodiment, a syntax element associated to the encoded predicted frame signals that temporal prediction from said predicted frame is not allowed.

In an embodiment, a syntax element associated to the encoded real frame signals that a display of this real frame is not allowed.

In an embodiment, the electronic circuitry is further adapted for receiving a new version of at least one predicted frame stored in the frame buffer, said new version corresponding to a reencoding of said predicted frame using a frame buffer in which at least one preceding predicted frame has been replaced by a corresponding real frame, and for replacing the reconstructed version of the predicted frame stored in the frame buffer by the new version.

In an embodiment, each encoded frame is associated to a syntax element indicating if said frame is a real frame or a predicted frame.

In an embodiment, real frames form a first layer of a multi-layer video encoding and predicted frames form at least one second layer of the multi-layer video encoding.

In an embodiment, each encoded frame is associated to a syntax element authorizing a real frame and a predicted frame corresponding to a same time to use a same frame identifier representing an order of decoding of the frame.

In an embodiment, the electronic circuitry is further adapted for:

- obtaining information representative of a third action actually performed by the user at the second time in the gaming application;
- predicting a frame, called final frame, corresponding to the third action from data comprising at least the predicted frame corresponding to the second action and the information representative of the third action using a neural network.

In an embodiment, the electronic circuitry is further adapted for controlling a display of the predicted frame or of the final frame.

In a fourteenth aspect, one or more of the present embodiments provide an apparatus comprising a device according to the twelfth or thirteenth aspect.

In a fifteenth aspect, one or more of the present embodiments provide a system comprising a server comprising a device according to the twelfth aspect and a client system comprising a device according to the thirteenth aspect.

In a sixteenth aspect, one or more of the present embodiments provide a signal generated by the method of the tenth aspect or by the device of twelfth aspect.

In a seventeenth aspect, one or more of the present embodiments provide a computer program comprising program code instructions for implementing the method of the tenth or eleventh aspect.

In an eighteenth aspect, one or more of the present embodiments provide a non-transitory information storage medium storing program code instructions for implementing the method of the tenth or eleventh aspect.

4. BRIEF SUMMARY OF THE DRAWINGS

Figures 2, 3:
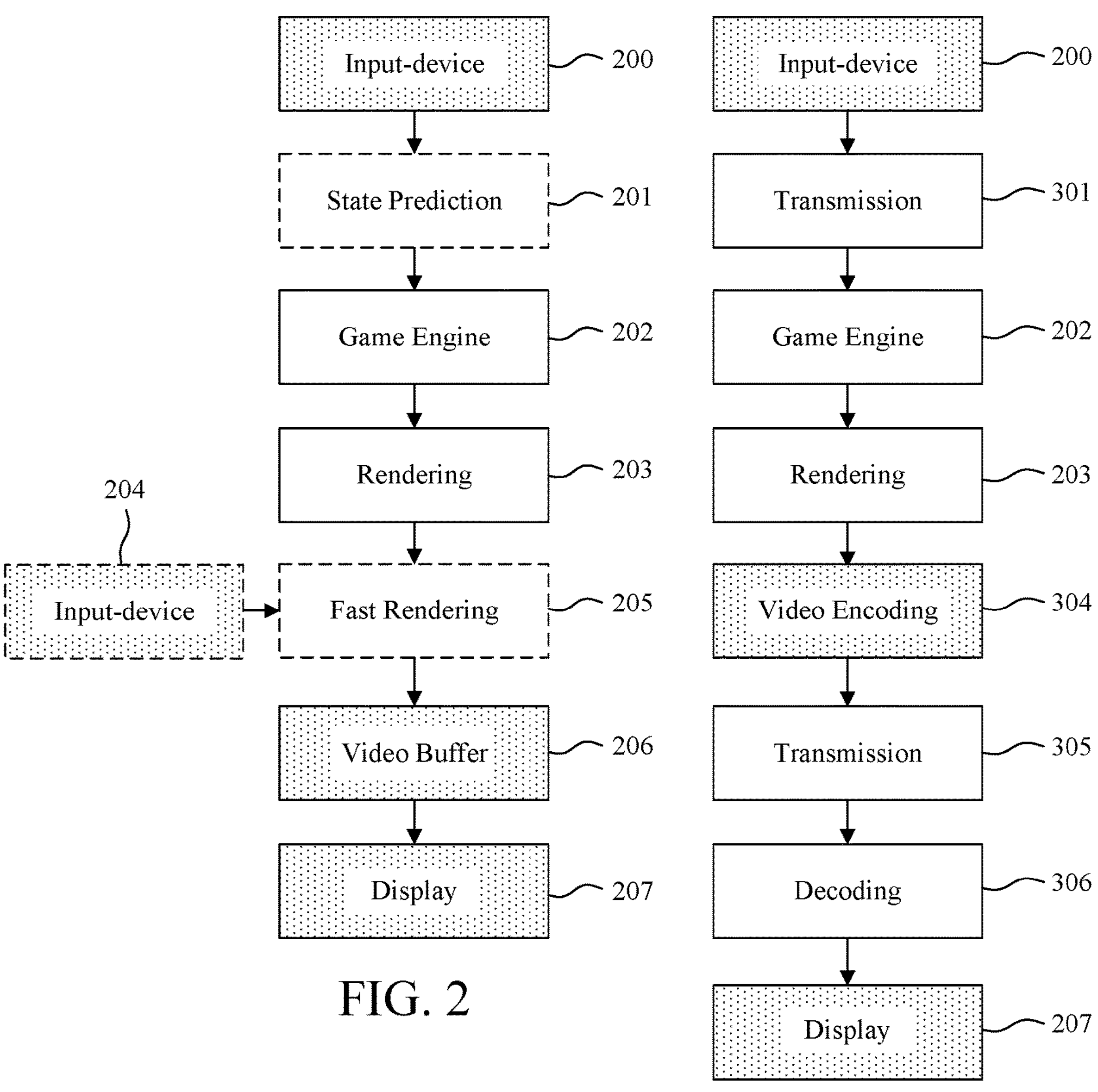
Figure 5:
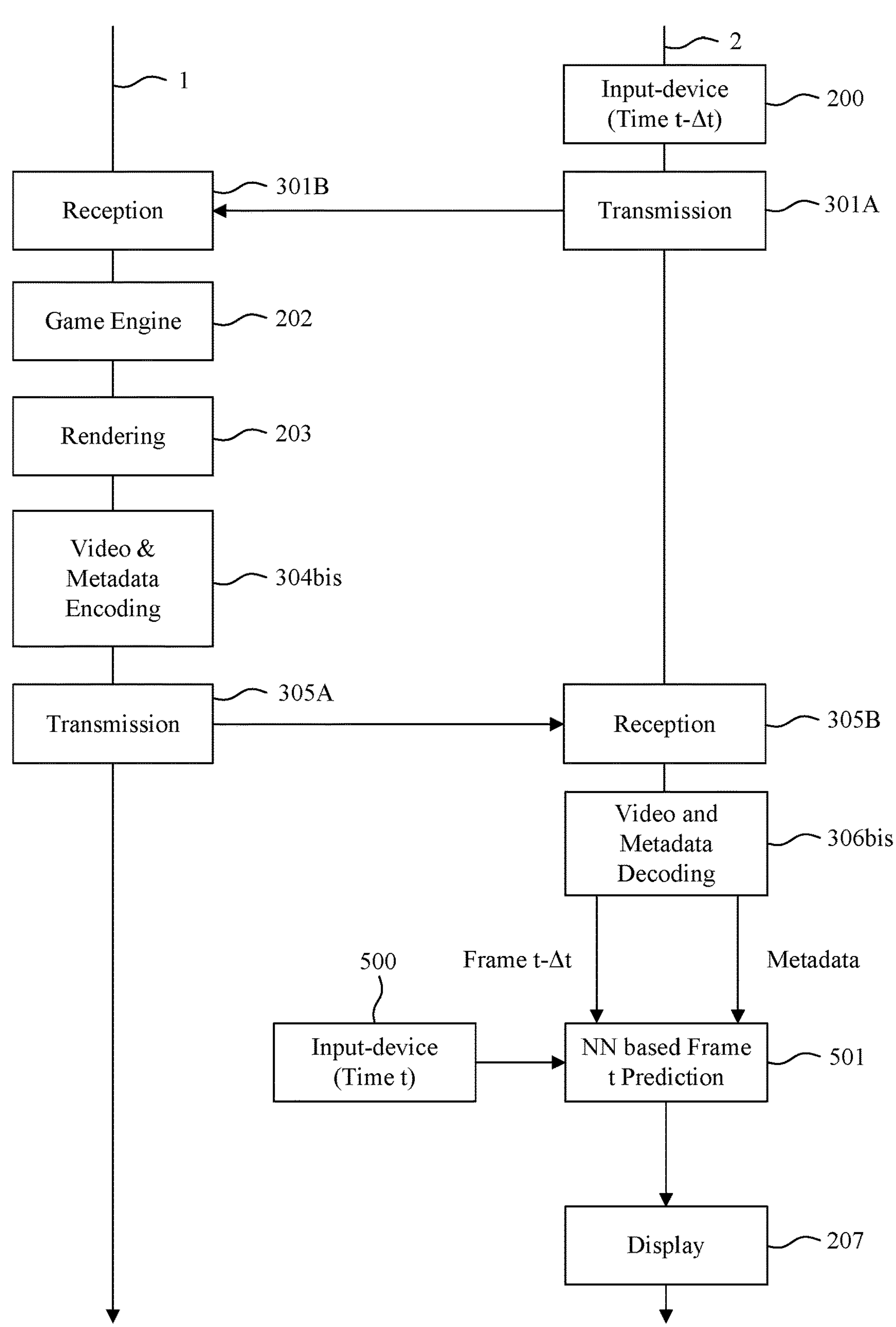
Figure 6:
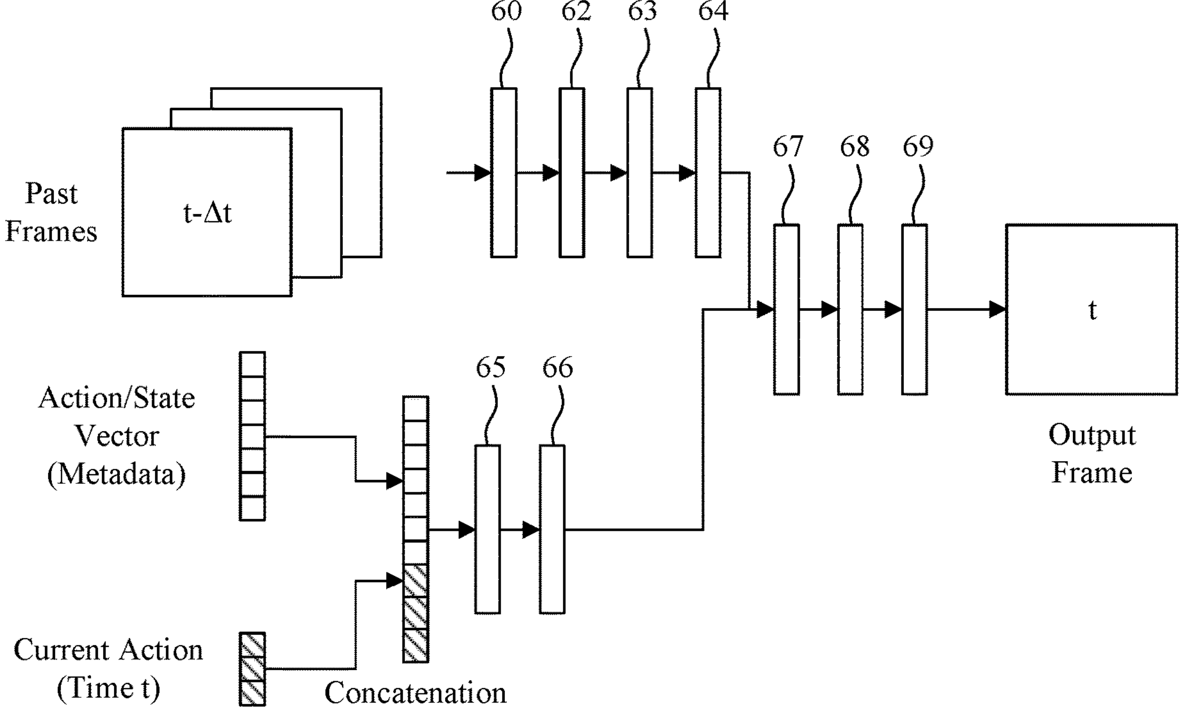
Figure 7:
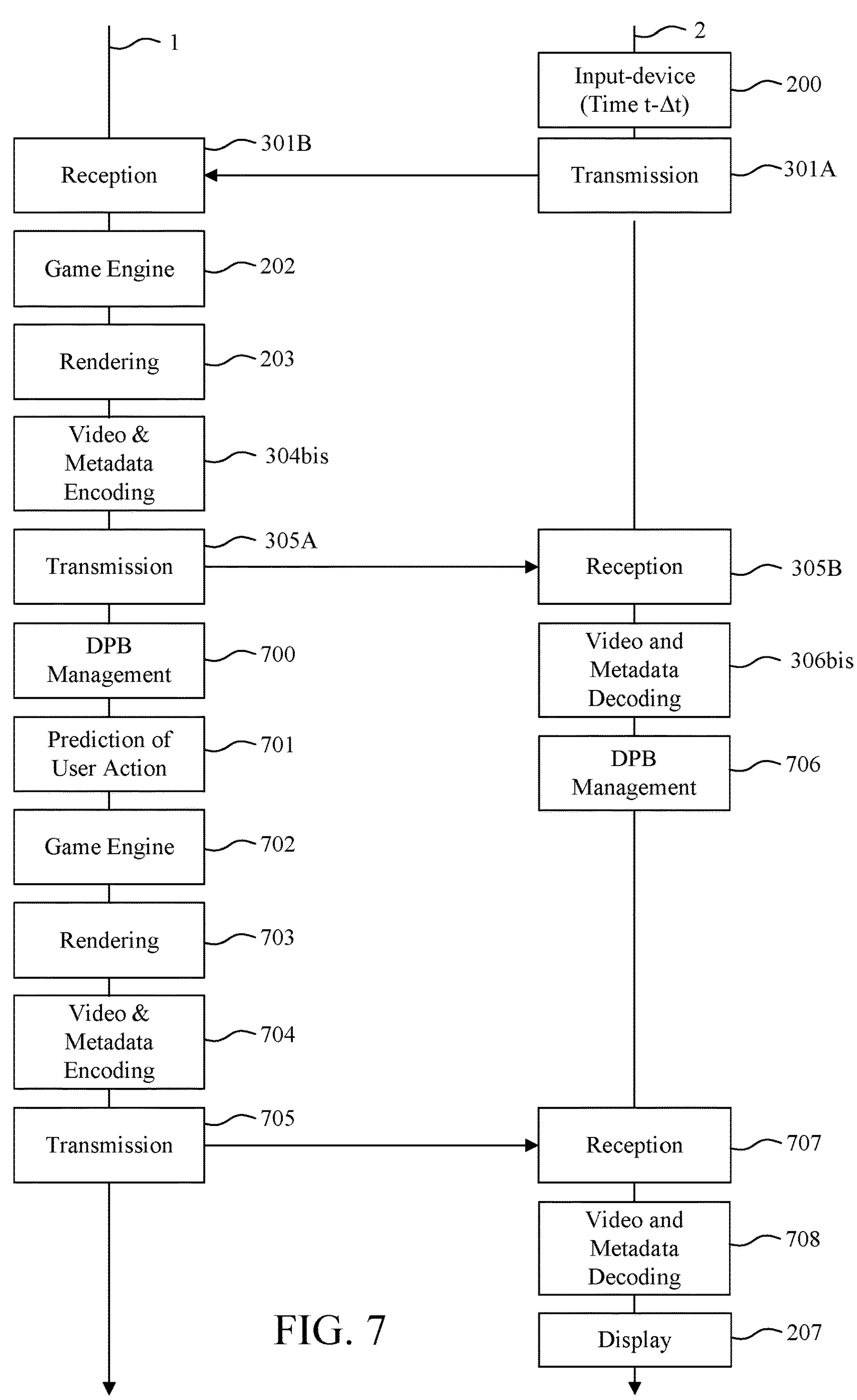
Figure 8:
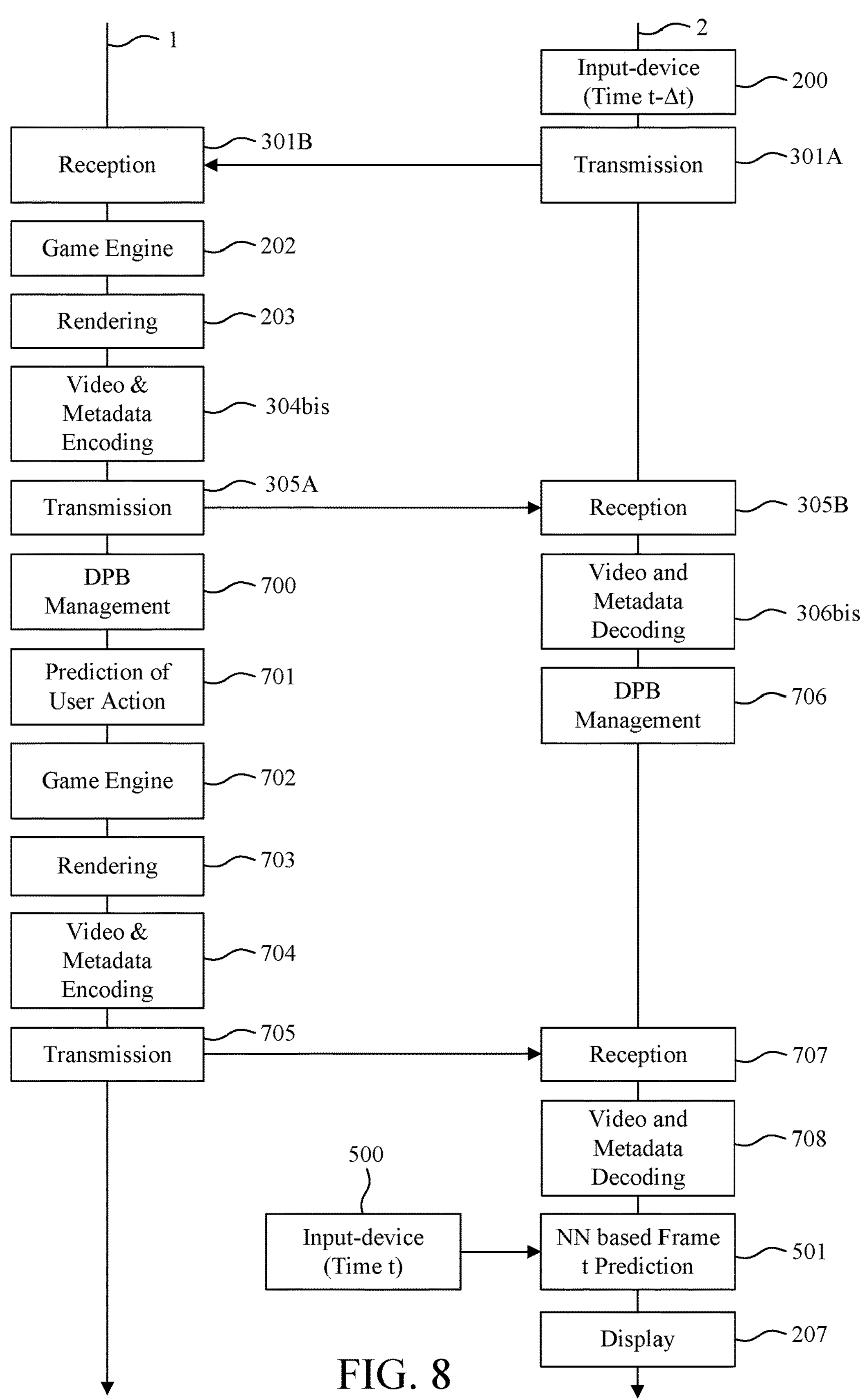
Figure 9:
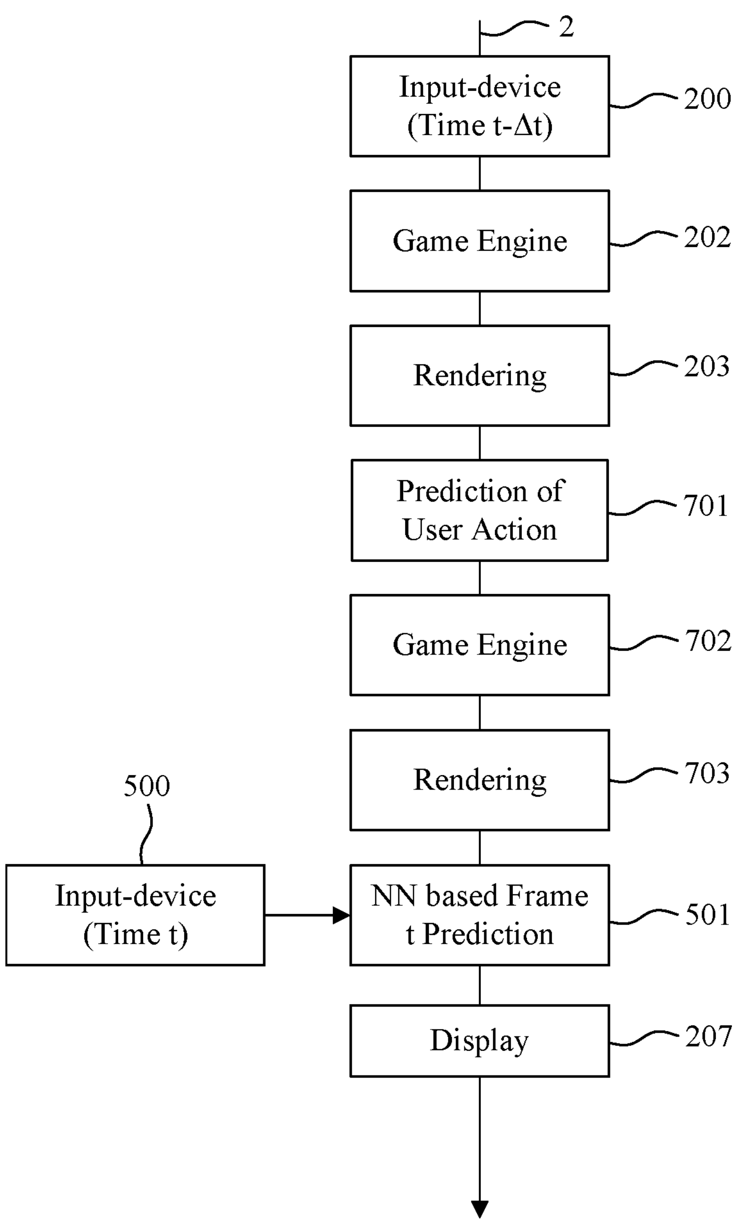

FIG. 2 describes schematically a typical motion-to-photon path in a traditional gaming application;

FIG. 3 describes schematically a typical motion-to-photon path in a cloud gaming application;

Figures 4A, 4B:
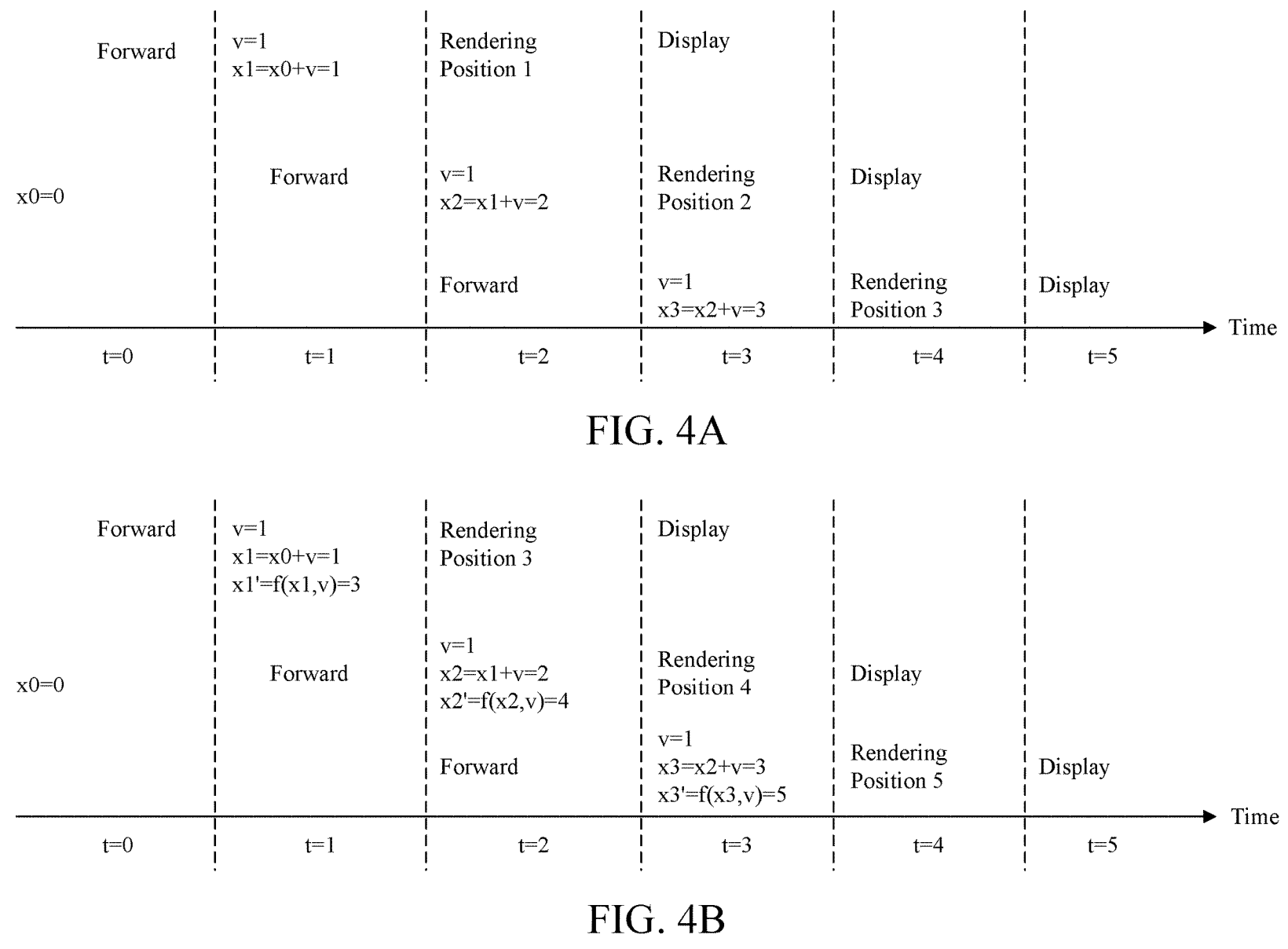

FIGS. 4A and 4B represents examples of execution of the method of FIG. 2 respectively without and with a state prediction;

FIG. 5 illustrates schematically an example of a first embodiment of a method for reducing latency in a cloud gaming application;

FIG. 6 illustrates schematically a simplified view of a neural network;

FIG. 7 illustrates schematically an example of a second embodiment of a method for reducing latency in a cloud gaming application;

FIG. 8 illustrates schematically an example of a third embodiment of a method for reducing latency in a cloud gaming application; and, FIG. 9 illustrates schematically an example of an embodiment of a method for reducing latency in a stand-alone gaming application.

5. DETAILED DESCRIPTION

Various methods addressed the problem of latency reduction in the past. These methods can be divided in two categories:

methods based on states prediction; and, methods based on an approximate rendering.

Methods based on states prediction, such as method based on extended Kalman filters (EKF) or on particular filters, consist in predicting future states of a game in order to compute a rendering ahead of a current real state of the game. In the process of FIG. 2, an optional step of state prediction 201 is introduced.

FIGS. 4A and 4B represents examples of execution of the method of FIG. 2 respectively without and with the state prediction step 201.

In FIG. 4A, at time t=0, the user, for example, pushes a forward button on the input device. This action is interpreted as a velocity v of "1". A new position is computed from the velocity v=1 and the previous position x0=0. The new position is now x1=1. From the new position, a rendering is performed and sent to the display device. At time t=3, the user can see the results of its action with a latency of "3" (from t=0 to t=3). Optimally, without any latency, the user would have seen the frame with position "0" at t=0, the frame with position "1" at t=1 etc.

In FIG. 4B, at time t=0, the user pushes the forward button on the input device. This action is interpreted as a velocity v of "1". The new "real" position is computed from the velocity v=1 and the previous position x0=0. The new "real" position is now x1=1. A predicted position is computed (step 201), using a function $f(\ )$, from the real position and other current state information (for example here, the velocity). The predicted position aims at predicting the position at time "t"=3 instead of using the current state only. Here the predicted position is x1'=3. From the predicted position, a rendering is performed and sent to the display. At time t=3, the user could have seen the result of its action with a latency of "3" (from t=0 to t=3), but the state prediction "erases" this latency and the user sees the result of its action at time t=3 (assuming here that the state predictor correctly predicted the state evolution). Optimally, if the state predictor is "perfect", the user will see the frame with position "0" at t=0, the frame with position "1" at t=1 etc. In practice, the function $f(\ )$ is based on a combination of current state values and user motion model. A typical example consists in using a Kalman filtering to predict such motion. In practice, more sophisticated predictor (Model Predictive Control) or ad-hoc models are used. Recently, deep-learning based method allowed a significant improvement on video frame prediction. As an example, in document "C. Finn, I. Goodfellow and S. Levine, *unsupervised learning for physical interaction through video prediction, in Advances in Neural Information Processing Systems,* 2012", called FINN in the following, a neural network (NN) is built to predict future frames of a video sequence using past frames and actions/states as input. FINN introduces a class of video prediction models that directly use appearance information from previous frames to construct pixel predictions. Such models compute a next frame by first predicting the motions of image segments and then merge these predictions via masking.

An example of method based on an approximate rendering is represented in FIG. 2 by an insertion of steps 204 et 205. Such methods are known as time warping or Asynchronous Time warping (ATW).

Step 204 consists in obtaining new user action, newer than the user action obtained in step 200.

In step 205, the frame generated at step 203 (based on the user action obtained at step 200) and the new action are used to create an approximate version of the frame that would have been rendered by steps 202 and 203 using the new user action. A fast rendering process is used to generate said approximate version. A typical fast rendering process consists in computing a warped image from the user rotational motion only (i.e. the warping transformation can be computed as an homography transform). More advanced methods also use other information (depth map, dynamic object positions etc.) to improve the approximate rendering.

Figure 1A:
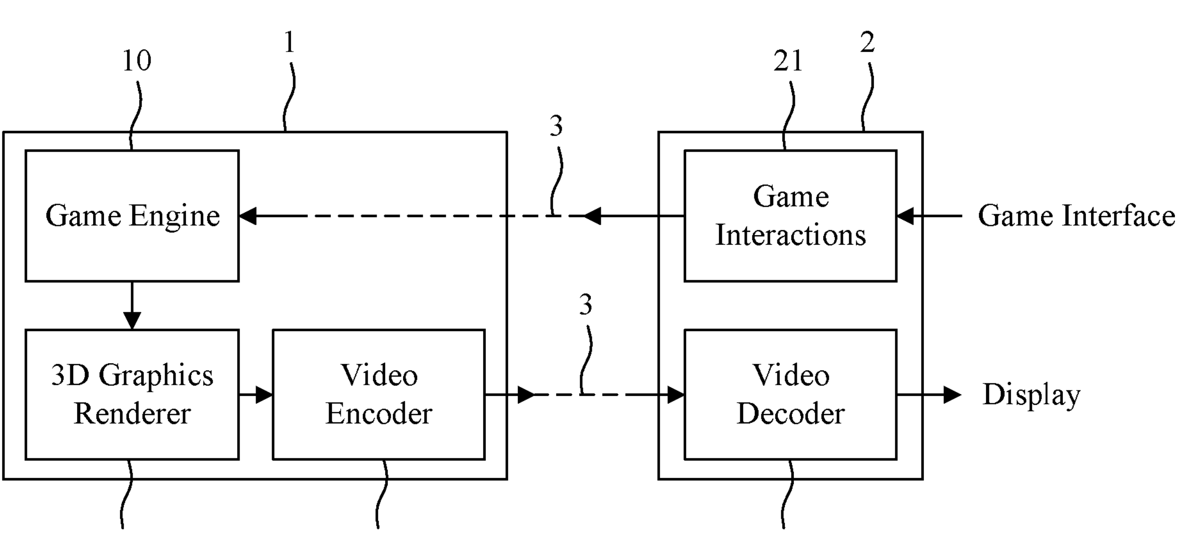
FIG. 1A represents schematically a cloud gaming infrastructure.
Figure 1B:
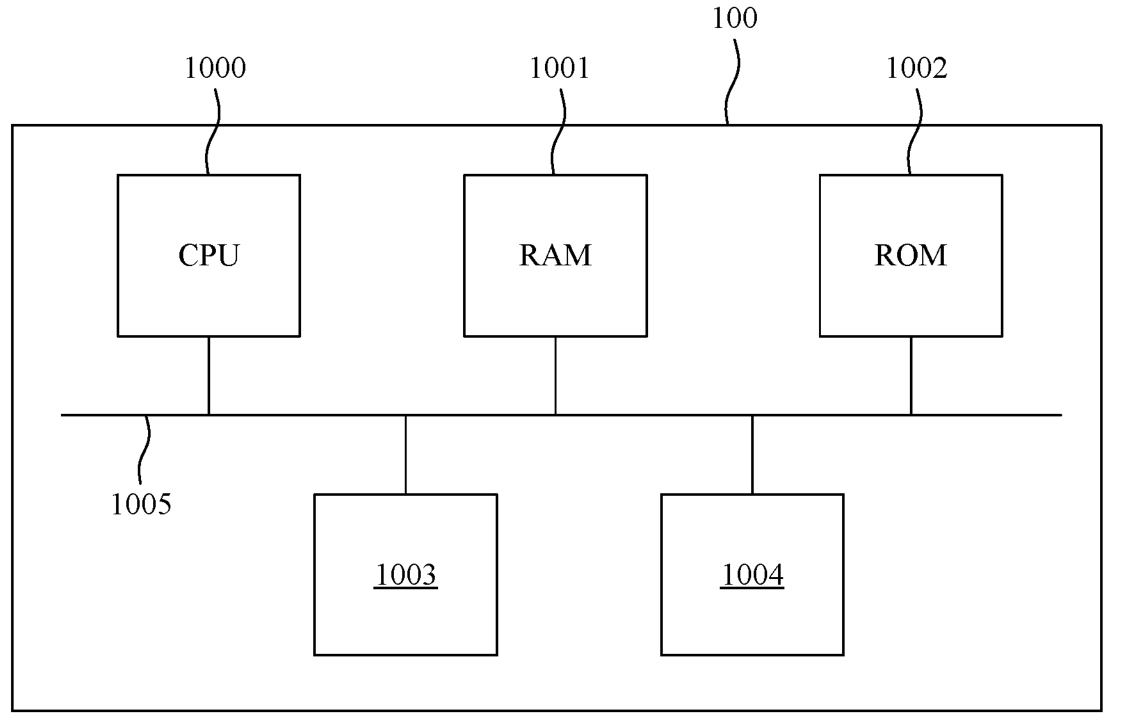
FIG. 1B illustrates schematically an example of hardware architecture of a processing module able to implement various aspects and embodiments.

FIG. 1B illustrates schematically an example of hardware architecture of a processing module 100 able to implement steps of a game application implemented by the server 1 or steps of a game application implemented by the user game system 2. The processing module is therefore comprised in the server 1 or in the user game system 2. The processing module 100 comprises, connected by a communication bus 1005: a processor or CPU (central processing unit) 1000 encompassing one or more microprocessors, general purpose computers, special purpose computers, and processors based on a multi-core architecture, as non-limiting examples; a random access memory (RAM) 1001; a read only memory (ROM) 1002; a storage unit 1003, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 1004 for exchanging data with other modules, devices or equipment. The communication interface 1004 can include, but is not limited to, a transceiver configured to transmit and to receive data over a communication channel. The communication interface 1004 can include, but is not limited to, a modem or network card.

If the processing module 100 implements the steps of a gaming application executed by the server 1, the communication interface 1004 enables for instance the processing module 100 to receive information representative of user actions from the user game system and to transmit a video stream embedding encoded frames an metadata to said user game system. If the processing module 100 implements the steps of a game application executed by the user game system 2, the communication interface 1004 enables for instance the processing module 100 to send information representative of user actions to the server 1 and to receive a video stream comprising encoded frames and metadata.

The processor 100 is capable of executing instructions loaded into the RAM 1001 from the ROM 1002, from an external memory (not shown), from a storage medium, or from a communication network. When the processing module 100 is powered up, the processor 1000 is capable of reading instructions from the RAM 1001 and executing them. These instructions form a computer program causing, for example, the implementation by the processor 1000 of the steps of a gaming application executed by the server 1, as described in the following in the left part of FIG. 5, 7 or 8 or the steps of a gaming application executed by the user game system 2, as described in the following in the right part of FIG. 5, 7 or 8.

All or some of the algorithms and steps of said gaming application may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 1C:
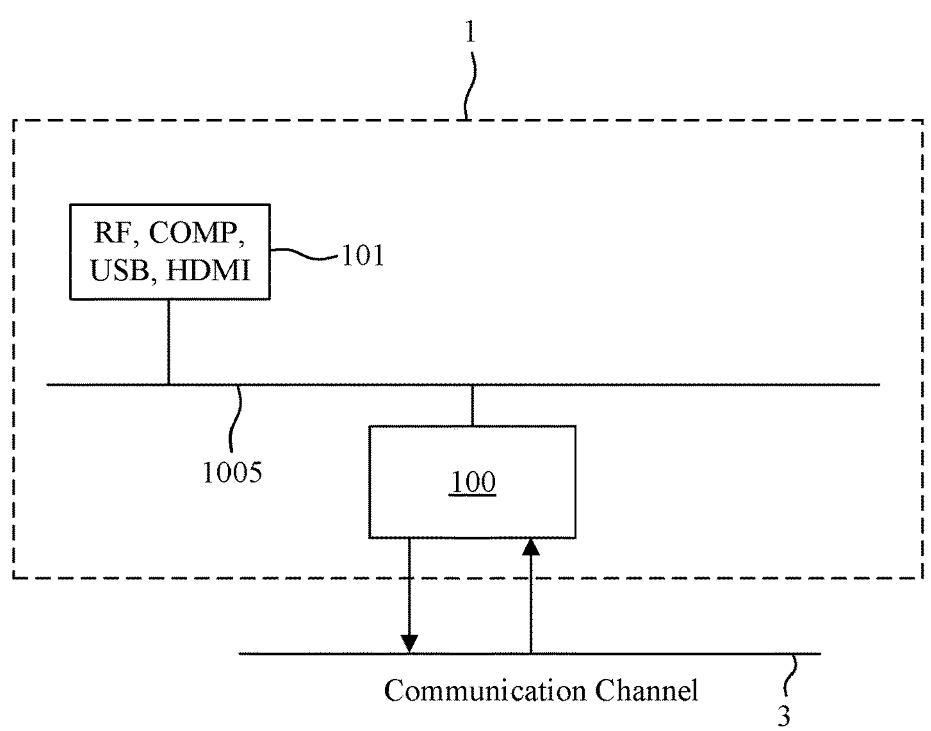
FIG. 1C illustrates a block diagram of an example of a server in which various aspects and embodiments are implemented.
Figure 1D:
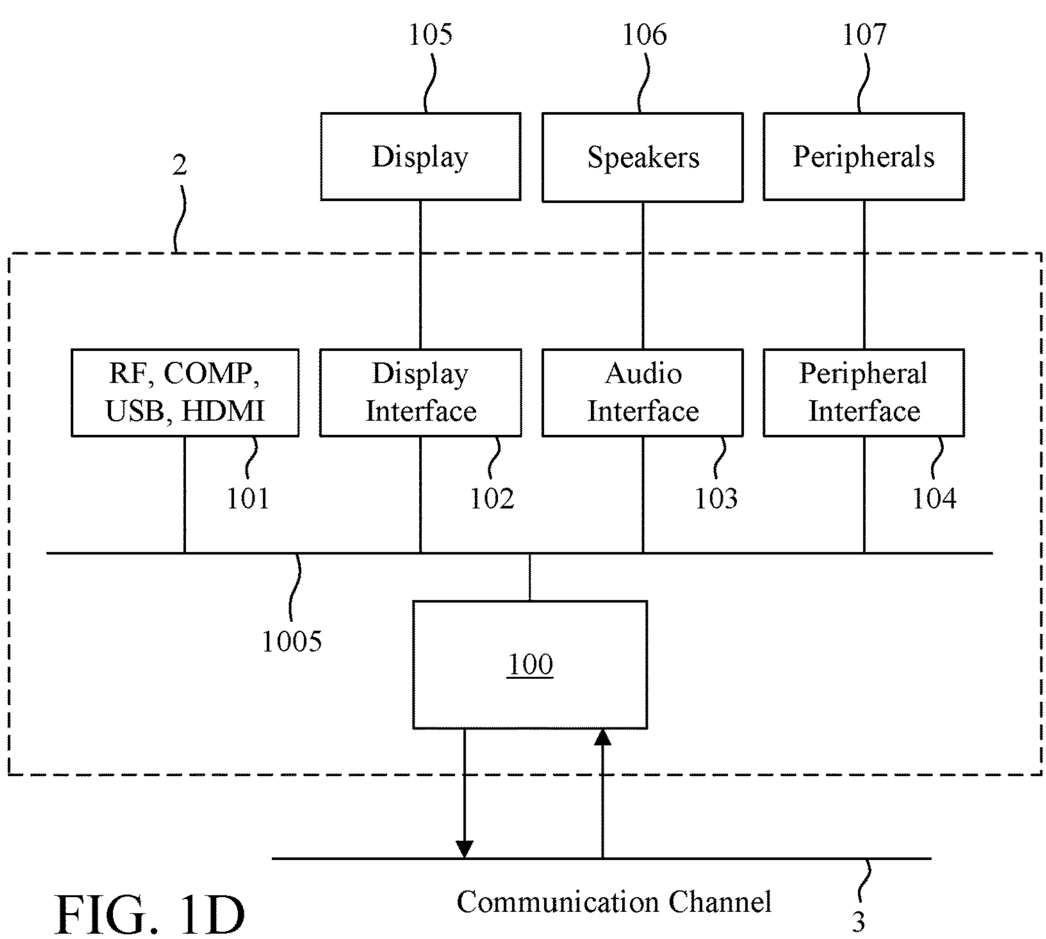
FIG. 1D illustrates a block diagram of an example of a user game system in which various aspects and embodiments are implemented.

FIG. 1D illustrates a block diagram of an example of the user game system 2 in which various aspects and embodiments are implemented. The user game system 2 can be embodied as a device including the various components described below and is configured to perform one or more of the aspects and embodiments described in this document. Examples of such device include, but are not limited to, various electronic devices such as personal computers, laptop computers, smartphones, tablet computers, gaming consoles and head mounted displays. Elements of user game system 2, singly or in combination, can be embodied in a single integrated circuit (IC), multiple ICs, and/or discrete components. For example, in at least one embodiment, the user game system 2 comprises one processing module 100 that implements steps of the gaming application concerning the user gaming system. In various embodiments, the user gaming system 2 is communicatively coupled to one or more other systems, or other electronic devices, via, for example, a communications bus or through dedicated input and/or output ports. In various embodiments, the user game system 2 is configured to implement one or more of the aspects described in this document.

The input to the processing module 100 can be provided through various input modules as indicated in block 101. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 1D, include composite video.

In various embodiments, the input modules of block 101 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting user game system 2 to other electronic devices across USB and/or HDMI connections. It is to be understood that various aspects of input processing, for example, Reed-Solomon error correction, can be implemented, for example, within a separate input processing IC or within the processing module 100 as necessary. Similarly, aspects of USB or HDMI interface processing can be implemented within separate interface ICs or within the processing module 100 as necessary. The demodulated, error corrected, and demultiplexed stream is provided to the processing module 100.

Various elements of user game system 2 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the user game system 2, the processing module 100 is interconnected to other elements of said user game system 2 by the bus 1005.

The communication interface 1004 of the processing module 100 allows the user game system 2 to communicate on the communication channel 3. As already mentioned above, the communication channel 3 can be implemented, for example, within a wired and/or a wireless medium.

Data is streamed, or otherwise provided, to the user game system 2, in various embodiments, using a wireless network such as a Wi-Fi network, for example IEEE 802.11 (IEEE refers to the Institute of Electrical and Electronics Engineers). The Wi-Fi signal of these embodiments is received over the communications channel 3 and the communications interface 1004 which are adapted for Wi-Fi communications. The communications channel 3 of these embodiments is typically connected to an access point or router that provides access to external networks including the Internet for allowing streaming applications and other over-the-top communications. Other embodiments provide streamed data to the user game system 2 using the RF connection of the input block 101. As indicated above, various embodiments provide data in a non-streaming manner. Additionally, various embodiments use wireless networks other than Wi-Fi, for example a cellular network or a Bluetooth network.

The user game system 2 can provide an output signal to various output devices, including a display system 105, speakers 106, and other peripheral devices 107. The display system 105 of various embodiments includes one or more of, for example, a touchscreen display, an organic light-emitting diode (OLED) display, a curved display, and/or a foldable display. The display 105 can be for a television, a tablet, a laptop, a cell phone (mobile phone), ahead mounted display or other devices. The display system 105 can also be integrated with other components (for example, as in a smart phone), or separate (for example, an external monitor for a laptop). The other peripheral devices 107 include, in various examples of embodiments, one or more input devices such as a stand-alone digital video disc (or digital versatile disc) (DVR, for both terms), a disk player, and a user actions acquisition device such as a joypad and one or more output devices such as a stereo system, or a lighting system.

In various embodiments, control signals are communicated between the user game system 2 and the display system 105, speakers 106, or other peripheral devices 107 using signaling such as AV.Link, Consumer Electronics Control (CEC), or other communications protocols that enable device-to-device control with or without user intervention. The output/input devices can be communicatively coupled to user game system 2 via dedicated connections through respective interfaces 102, 103, and 104. Alternatively, the output/input devices can be connected to user game system 2 using the communications channel 3 via the communications interface 1004 or a dedicated communication channel corresponding to the communication channel the communication interface 1004. The display system 105 and speakers 106 can be integrated in a single unit with the other components of user game system 2 in an electronic device such as, for example, a television. In various embodiments, the display interface 102 includes a display driver, such as, for example, a timing controller (T Con) chip.

The display system 105 and speaker 106 can alternatively be separate from one or more of the other components. In various embodiments in which the display system 105 and speakers 106 are external components, the output signal can be provided via dedicated output connections, including, for example, HDMI ports, USB ports, or COMP outputs.

FIG. 1C illustrates a block diagram of an example of the server 1 in which various aspects and embodiments are implemented. Server 1 is very similar to the user game system 2. The server 1 can be embodied as a device including the various components described below and is configured to perform one or more of the aspects and embodiments described in this document. Examples of such devices include, but are not limited to, various electronic devices such as personal computers, laptop computers and a server. Elements of the server 1, singly or in combination, can be embodied in a single integrated circuit (IC), multiple ICs, and/or discrete components. For example, in at least one embodiment, the server 1 comprises one processing module 100 that implements the steps of a gaming application concerning the server 1 as represented below by the left side of FIG. 5. In various embodiments, the server 1 is communicatively coupled to one or more other systems, or other electronic devices, via, for example, a communications bus or through dedicated input and/or output ports. In various embodiments, the server 1 is configured to implement one or more of the aspects described in this document.

The input to the processing module 100 can be provided through various input modules as indicated in block 101 already described in relation to FIG. 1D.

Various elements of the server 1 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the server 1, the processing module 100 is interconnected to other elements of said server 1 by the bus 1005.

The communication interface 1004 of the processing module 100 allows the server 1 to communicate on the communication channel 3.

Data (for example data representative of the user actions) is provided to the server 1 or (for example the video stream) transmitted (streamed) by the server 1, in various embodiments, using a wireless network such as a Wi-Fi network, for example IEEE 802.11 (IEEE refers to the Institute of Electrical and Electronics Engineers). The Wi-Fi signal of these embodiments is received over the communications channel 3 and the communications interface 1004 which are adapted for Wi-Fi communications. The communications channel 3 of these embodiments is typically connected to an access point or router that provides access to external networks including the Internet for allowing streaming applications and other over-the-top communications. Other embodiments provide data to the server 1 or allow the server to transmit data using the RF connection of the input block 101.

Additionally, various embodiments use wireless networks other than Wi-Fi, for example a cellular network or a Bluetooth network.

The data provided to or transmitted by the server 1 can be provided or transmitted in different format. In various embodiments, in case of transmission, these data are encoded and compliant with a known video compression format such as MPEG-4/AVC (ISO/CEI 14496-10), HEVC (ISO/IEC 23008-2—MPEG-H Part 2, High Efficiency Video Coding/ITU-T H.265)), EVC (Essential Video Coding/MPEG-5), AV1, VP9 or the international standard entitled Versatile Video Coding (VVC) under development by a joint collaborative team of ITU-T and ISO/IEC experts known as the Joint Video Experts Team (JVET).

The server 1 can provide an output signal to various output devices capable of storing, decoding and/or displaying the output signal such as the user game system.

Various implementations involve decoding. "Decoding", as used in this application, encompasses all of the processes performed, for example, on a received encoded video stream in order to produce a final output suitable for display. In various embodiments, such processes include the processes typically performed by a decoder, for example, entropy decoding, inverse quantization, inverse transformation, and prediction.

Various implementations involve encoding. In an analogous way to the above discussion about "decoding", "encoding" as used in this application encompasses all of the processes performed, for example, on the frames generated by the rendering step 203 in order to produce an encoded video stream. In various embodiments, such processes include the processes typically performed by an encoder, for example, partitioning, prediction, transformation, quantization, and entropy encoding.

Note that the syntax elements names as used in the following, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the video encoder signals a use of some coding tools. In this way, in an embodiment the same parameters can be used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the encoded video stream and SEI messages of a described embodiment. Such a signal can be formatted, for example, as an electromagnetic wave (for example, using a radio frequency portion of spectrum) or as a baseband signal. The formatting can include, for example, encoding an encoded video stream and modulating a carrier with the encoded video stream. The information that the signal carries can be, for example, analog or digital information. The signal can be transmitted over a variety of different wired or wireless links, as is known. The signal can be stored on a processor-readable medium.

FIG. 5 illustrates schematically an example of a first embodiment of a method for reducing latency in a cloud gaming application.

In the first embodiment illustrated in FIG. 5, the user game system 2 perfectly knows the user action at a current time t, called current action, but it receives the frames from the server 1 with a delay $\Delta t$. A neural network (NN) is used for generating (predicting) a frame for current time t from frames and metadata received from the server 1 and current (and past) actions.

The method of FIG. 5 is derived from the method of FIG. 3. Comparing to FIG. 3, steps were split in steps executed by the server 1 on the left side and steps executed by the user game system 2 on the right side.

In step 200, the processing module 100 of the user game system 2 registers a user action. This user action corresponds to time $t-\Delta t$.

Step 301 of FIG. 3 is split in steps 301A and 301B. In step 301A, the processing module 100 of the user game system 2 transmits information representative of the user action.

In step 301B, the processing module 100 of the server 1 receives the information representative of the user action.

This information is used by the processing module 100 of the server 1 in the game engine step 202 and the rendering step 203 to produce a frame. Said frame corresponds to the action at time t-d t and is therefore called frame $t-\Delta t$.

In a step 304*bis*, the processing module 100 of the server 1 encodes the frame $t-\Delta t$ in a video stream. The processing module 100 of the server 1 implements therefore a video encoding module. Any known encoding method could be used in step 304*bis* such as AVC, HEVC, VVC, EVC, AV1 or VP9.

Steps 202, 203 and 304*bis* allows therefore obtaining an encoded frame $t-\Delta t$.

Step 305 of FIG. 3 is split in steps 305A and steps 305B in FIG. 5.

In step 305A, the processing module 100 of the server 1 transmits a portion of the video stream corresponding to the frame $t-\Delta t$ to the user game system 2.

In step 305B, the processing module 100 of the user game system 2 receives the portion of the video stream corresponding to the frame $t-\Delta t$.

In a step 306*bis*, the processing module 100 of the user game system 2 decodes said portion of the bitstream to reconstruct frame $t-\Delta t$. The processing module 100 of the user game system 2 implements therefore a video decoding module. A decoding method corresponding to the encoding method used in step 304*bis* is used in step 306*bis*.

In a step 501, the processing module 100 of the user game system 2 uses a NN to predict a frame corresponding to an action of the user captured by the input device at time t in a step 500, time t following time $t-\Delta t$. Said frame is called frame t in the following. As can be seen, in step 500, the processing module 100 of the user game system 2 obtains an information representative of a second action performed at time t, the second action following the first action performed at time $t-\Delta t$ registered in step 200. The prediction of frame t performed in step 501 uses as input at least the frame $t-\Delta t$ and an information representative of the action of the user at time t (i.e. second action). Step 501 is detailed in the following in relation to FIG. 6.

In a step 207, the frame t resulting from the prediction by the NN in step 501 is displayed under the control of the processing module 100 of the user game system 2.

As can be seen, the user only sees predicted frames.

In a variant of the first embodiment, metadata associated with frame $t-\Delta t$ are encoded in the video stream in step 304*bis*. These metadata are representative for example of the action corresponding to frame $t-\Delta t$ and/or of a status of the game corresponding to time $t-\Delta t$. In step 306*bis*, the processing module 100 of the user game system 2 decodes said metadata in addition to the frame $t-\Delta t$. The information contained in these metadata are then concatenated to the information representing of the last action of the user registered in step 500 and inputted in the NN.

In an embodiment, information representative of the status of the game are conveyed in a SEI message. A SEI (Supplemental Enhancement Information) message as defined for example in standards such as AVC, HEVC or VVC is a data container associated to a video stream and comprising metadata providing information relative to the video stream.

TABLE TAB1

```
game_state_sei( ) {
    number_of_state
    for( i = 0; i <= number_of_state; i++ )
        state[i]
}
```

An example of syntax of a SEI message game_state_sei( ) intended to convey the information representative of the status of the game is described in table TAB1. The SEI message game_state_sei comprises a syntax element number_of_state indicating a number of status described in the SEI message and at least one syntax element state[i] comprising the information representative of a status. Information representative of a status can comprise:

- Information representative of the user: user position, user speed, user body position, position and/or speed of an avatar representative of the user in the game;
- Information representative of dynamic objects or of other users in the game such as the presence or absence of said object or other users, a position, a velocity, a state and a type. As the number of states conveyed in the game_state_sei( ) SEI message is limited by number of state, the maximum number of dynamic objects reported in said SEI message might be capped. As the network is a frame-based predictor, sorting the dynamic objects in function of their sizes in frames might be a good heuristic to populate the state vector, only largest dynamic objects being considered.
- Other information: special effects on/off, day/night, etc.

As the frame prediction by the NN is frame based, the status information could be expressed in the form of frame information such as pixel coordinates, motion vectors, pixel values, amount of pixels representing an object, variance of pixels representing an object, etc.

FIG. 6 illustrates schematically a simplified view of the NN used for frame prediction in step 501. This NN corresponds, for example, to the NN described in details in FINN. This network comprises a set of convolutional kernels 60 to 69. Kernels adapted to images 60 to 64 receive at least frame t−Δt as input. Kernels 65 and 66 adapted to non-image information receive as input at least information representative of the action at time t. The output of kernels 60 to 64 and kernels 65 and 66 in then input to the kernels 67 to 69 which output the frame t.

The training of the NN starts with generic NN parameters. These generic NN parameters are then refined iteratively in order to obtain NN parameters allowing obtaining an accurate frame prediction in the context of the game. To do so, data, called real data, are obtained from real executions of the game. The real data comprise, for example, a chunk of frames produced by the game and data, called context data, comprising information representative of the game status and of user inputs corresponding to each frame of the chunk. User inputs can be either simulated or recorded from real human gameplay. Using the frames of the chunk and corresponding context data as input data, predictions of a current frame from past frames and corresponding context data are iteratively performed using the NN. For each frame prediction, the predicted current frame and the real frame corresponding to the same time than the current frame are compared using a loss function. Examples of loss functions comprises functions based on a L2 or L1 norm of the frame difference, but more sophisticated loss functions can advantageously be used to improve the prediction quality, such as Generative Adversarial Network (GAN) based penalty, regularization terms, etc. At each iteration, the NN parameters are refined with the objective of reducing the loss at the next iteration. When the loss is sufficiently low or when a number of iterations is attained, the training stops and the final NN parameters are kept.

In a first variant of step 501, the NN of FIG. 6 is trained offline for a particular game. In this first variant, the processing module 100 of the user game system uses the trained NN network with these final parameters without any modification in each execution of step 501.

In a second variant of step 501, the NN of FIG. 6 is trained exclusively on the fly during a current execution of the game. In this second variant, the processing module 100 of the user game system 2 starts with a NN with generic NN parameters and then refines the NN parameters during step 501 using the real data (frames and context data decoded from the video stream) it receives and by comparing each predicted current frame to a real frame corresponding to the same time than the current predicted frame as soon as said real frame is available on the user game system 2 side. Comparing to the first variant of step 501, the second variant allows to converge to a NN better adapted to a current execution of the game. However, first frame predictions by the NN are inaccurate as long as the NN parameters are not sufficiently refined.

In a third variant of step 501, the offline trained NN of the first variant of step 501 is used to initialize the NN of the second variant of step 501 in place if the NN using generic parameters. Consequently, at the start of a current execution of a game, predictions are at least adapted to said game and the NN is then refined to better adapt to said current execution.

One can note that the second and third variants are close to learning methods based on reinforcement learning.

One feature to be considered during the NN training is the time difference between the predicted frame and the last real frame received by the NN. In the example of FIG. 5, the time difference corresponds to the time difference Δt between frame t−Δt and frame t. This time difference Δt depends on the time between an action of the user on the user game system 2 side and the obtaining of a frame corresponding to this action again on the user game system 2 side. This time depends mainly on the network latency.

In an embodiment, the processing modules 100 of the user game system 2 and of the server 1 collaborates to estimate this time difference. Each time the processing module 100 of the user game system 2 sends an information representative of an action of the user, said information is associated to an identifier input_timing of the time at which said action was executed. The identifier input_timing is therefore representative of said action. When the processing module 100 of the server 1 encodes a frame corresponding to this action, it associates to the video stream corresponding to this frame the identifier input_timing. Consequently, using the identifier associated to each frame it decodes, the processing module 100 of the user game system 2 is capable of identifying the action corresponding to said frame.

In an embodiment, the identifier input_timing associated with a frame is conveyed between the server 1 and the user game system 2 in a SEI message.

TABLE TAB2

```
frame_timing_sei( ) {
    input_timing
}
```

An example of syntax of a SEI message frame_timing_sei( ) intended to convey the identifier input_timing is described in table TAB2. The time difference is then computed by the processing module 100 of the user game system 2 for example as the difference between the time of reception of the SEI message frame_timing_sei and the time represented by the identifier input_timing.

Intuitively, predicting a frame that is ten frames latter than the last real frame is not the same thing than predicting a frame that is one or two frames latter than said last real frame.

This aspect could be easily considered in the variants of step 501 wherein the NN parameters are adapted on the fly during the execution of the game (second and third variant). Indeed, in that case, for example, the time difference $\Delta t$ could be fixed in function of real network conditions and measured latencies.

The situation is different when the NN are trained offline without taking into account observed network latencies, which is typically the case in the first variant of step 501. In that case, a solution consists in defining a plurality of values for the time difference $\Delta t$ and, for each defined value, in training a NN for said value of the time difference $\Delta t$. Hence, a NN is obtained (i.e. NN parameters are obtained) for each possible value of the time difference $\Delta t$. The processing module 100 of the user game system 2 knows each of these NN. In an embodiment, the processing module 100 of the user game system 2 selects the NN corresponding to the value of the time difference $\Delta t$ of the plurality the closest to latencies it has measured on the network. In another embodiment, an information representative of the NN to select is provided by the processing module 100 of the server 1. This information is for example conveyed in a SEI message generated by the processing module 100 of the server 1.

TABLE TAB3

```
predictor_id_sei( ) {
  predictor_id
}
```

Table TAB3 describes an example of syntax of a SEI message predictor_id_sei( ) conveying a syntax element predictor id. The syntax element predictor_id is representative of the NN to be used. Indirectly, the syntax element predictor_id is representative of the time difference $\Delta t$.

In a fourth variant of step 501, the NN of FINN is replaced by a recurrent NN (RNN). In that case, intermediate frames between frame t and frame t−$\Delta t$ might be generated as well in order to produce the final frame at time t.

In a variant of the method of FIG. 5, in order to improve the prediction, the rendering step 203 renders a frame larger than the actual displayed frame. For example, for a frame displayed in HD format (1920×1080), the rendered frame is set to 1984×1144 (border of 32 pixels on each side). In the video stream, a conformance window flags (sps_conformance_window_flag, sps_conf_win_left_offset, sps_conf_win_right_offset, sps_conf_win_top_offset, sps_conf_win_bottom_offset in document JVET-R2001-v8, Versatile Video Coding (Draft 9), Joint Video Experts Team (JVET) of ITU-T SG 16 WP 3 and ISO IEC JTC 1 SC 29 WG 11, 18th Meeting: by teleconference, 15-24 Apr. 2020 simply called JVET-R2001 in the following) are used to signal these borders. By doing so, the NN can use out of frame samples in order to predict future frames. During the training stage of the NN, only the displayed part of the image is taken into account in the loss function. At the user game system 2 side, the decoding module uses the conformance window values of the decoded images to set the displayed part of the image from the generated frame.

FIG. 7 illustrates schematically an example of a second embodiment of a method for reducing latency in a cloud gaming application.

In the second embodiment, the server 1 receives an information representative of an action of the user corresponding to a time t−$\Delta t$, called real action, and uses this real action to predict a future action, called predicted action, corresponding to a time t. To do so, a method based on states prediction as described above in relation to FIGS. 2, 4A and 4B is used. From the predicted action, a frame, called predicted frame t, corresponding to time t is generated and sent to the user game system 2. As soon as a real action corresponding to time t is received by the server 1, a frame corresponding to said real action, called real frame t, is generated and replaces the predicted frame t for future frame prediction.

The method described in relation of FIG. 7 starts with steps 200, 301A, 301B, 202, 203, 304*bis* 205A, 305B and 306*bis* which are identical to the corresponding steps of the method of FIG. 5.

The frame t−$\Delta t$ encoded at step 304*bis* and transmitted to the user game system 2 at step 305A, is a real frame.

Whatever the video compression method used for encoding frames in step 304*bis* and decoding frames in step 306*bis* (AVC, HEVC, EVC, VVC, AV1, VP9, etc), each of these methods use temporal prediction. Temporal prediction consists in predicting blocks of pixels of a current frame from at least one block of pixel of at least another frame, called reference frame, encoded and reconstructed before the current frame. Reconstructed frames are therefore kept by the encoder and the decoder as long as they can be used as a reference frame for temporal prediction of a current frame. Reconstructed frames are generally stored in a buffer of reconstructed frame called decoded picture buffer (DPB) in AVC, HEVC, EVC and VVC. Hence, a reconstructed version of the real frame t−$\Delta t$ is stored in the DPB of the encoding module, called encoder DPB, in step 304*bis*.

The generation of two types of frames (i.e. the predicted frames and the real frames) corresponding to a same time induces a particular management of the DPB on the encoding and decoding modules sides.

In a step 700, the processing module 100 of the server 1 replaces a predicted frame t−$\Delta t$ by the real frame t−$\Delta t$ in the encoder DPB, of the encoding module. Hence, all frames temporally predicted after the insertion of the real frame t−$\Delta t$ in the DPB can use the real frame t−$\Delta t$ as reference frame.

In a step 706, the processing module 100 of the user game system 2 replaces the predicted frame t−$\Delta t$ by the real frame t−$\Delta t$ received in step 305B in the DPB, called decoder DPB, of the decoding module. Hence, similarly to the encoder side, all frames temporally predicted after the insertion of the real frame t−$\Delta t$ in the DPB can use the real frame t−$\Delta t$ as reference frame.

In a step 701, the processing module 100 of the server 1 predicts a user action corresponding to time t using a method based on states prediction.

In a step 702, the processing module 100 of the server 1 use the game engine to determine a state of the game corresponding to the predicted action corresponding to time t.

In a step 703, the processing module 100 of the server 1 applies a rendering step from the state of the game determined in step 702 to generate a predicted frame t corresponding to the predicted user action corresponding to time t.

In a step 704, the processing module 100 of the server 1 encodes the predicted frame t. The encoding of the predicted frame t can potentially use the real frame t−Δt stored in the encoder DPB as a reference frame. A reconstructed version of the encoded predicted frame t is placed in the encoder DPB.

In a step 705, the processing module 100 of the server 1 transmits a portion of the video stream corresponding to the predicted frame t to the user game system 2.

In a step 707, the processing module 100 of the user game system 2 receives the portion of the video stream corresponding to predicted frame t.

In a step 708, the processing module 100 of the user game system 2 decodes said video stream to reconstruct the predicted frame t. The predicted frame t is placed in the decoder DPB.

In a step 709, the predicted frame t is displayed under the control of the processing module 100 of the user game system 2.

Here again, only frames resulting from a prediction, here a prediction of an action, is displayed on the user game system 2 side.

The second embodiment is particularly advantageous in case of multiple players participating to a same game. Indeed, in that case in step 301B, the processing module 100 of the server 1 receives actions originating from a plurality of users, generates a real frame based on these actions, but generates also a predicted action for each user of the plurality of users. These predicted actions are then used to generate a predicted frame t better reflecting the eventual interactions between the different users. This predicted frame t is shared by all users on their user game system 2.

In FIG. 7, the steps of generation of the predicted frame t (steps 701 to 704) follow the steps of generation of the real frame t−Δt (steps 202, 203 and 304*bis*). In a variant, these steps are executed in parallel by the processing module 100 of the server 1 with a synchronization to ensure that the frames required for temporal prediction are present in the encoder DPB when needed.

In a first variant of the method of FIG. 7, temporal prediction from a predicted picture is prevented (i.e. not allowed). In that case, a frame header layer syntax element ph_non_ref_pic_flag as described in HEVC and VVC can be used by the encoding module to signal to the decoding module that a frame cannot be used as a reference frame. ph_non_ref_pic_flag equals to "1" specifies that the picture associated with the frame header is never used as a reference picture. ph_non_ref_pic_flag equal to "0" specifies the picture associated with the frame header may or may not be used as a reference picture. When ph_non_ref_pic_flag=1, the encoding module knows that the corresponding frame doesn't need to be stored in the encoder DPB and the decoding module knows that the corresponding frame doesn't need to be stored in the decoder DPB.

In a second variant of the method of FIG. 7, a display of a real frame is prevented (i.e. not allowed) by the use of the frame header layer syntax element ph_pic_output_flag as described in HEVC and VVC. When a frame refers to a frame header comprising the flag ph_pic_output_flag equal to "0", this frame is not displayed. Accordingly, all real frames could be associated to a flag ph_pic_output_flag equal to "0" to prevent their display on the user game system 2 side.

In a third variant of the method of FIG. 7, predicted frames can be used as reference frames for temporal prediction. However as soon as a real frame is generated by the encoding module and stored in the encoder DPB, the processing module 100 of the server 1 starts a re-encoding of all predicted frames following this real frame. Hence, the predicted frames are re-encoded using an encoder DPB comprising said real frame instead of the predicted frame corresponding to the same time than this real frame. Re-encoded predicted frames are transmitted to the user game system 2 to replace predicted frames following the real frame in the decoder DPB. Encoder and decoder DPB are therefore synchronized. In a sub-variant, only a subset of the predicted frames following the real frame are re-encoded. For example, only the last predicted frame following the real frame is re-encoded.

In a fourth variant of the second embodiment, predicted frames can be used as reference frames for temporal prediction. However, as soon as a real frame is available, the predicted frame corresponding to the same time is replaced by the real frame in the encoder and decoder DPB. A real frame and predicted frames corresponding to a same time shares a same timestamp and are consequently difficult to distinguish. In order to allow the processing module 100 of the user game system 2 to recognize a real frame from a predicted frame, each frame is associated to a SEI message. Said SEI is derived from the frame_timing_sei( ) described in relation to table TAB2 already described above. In the fourth variant of the second embodiment, the frame_timing_sei( ) SEI message comprise a syntax element real frame.

TABLE TAB4

```
frame_timing_sei( ) {
  input_timing
  real_frame
}
```

real_frame=1 specifies that the frame associated to said SEI message is a predicted frame. real_frame=0 specifies that the frame associated to said SEI message is a real frame. As explained before, the syntax element input_timing allows identifying to which user action corresponds the frame associated to the SEI message. In a subvariant, real_frame=0 specifies that the frame associated to said SEI message is a real frame and real_frame>0 specifies that the frame associated to said SEI message is a predicted frame. When real_frame=i (i being an integer>0), the predicted frame associated to the SEI message corresponds to a $i^{st}$ version of the predicted frame, provided that predicted frames have been reencoded.

In a fifth variant of the second embodiment, all frames are stored in the encoder and decoder DPB, whatever their type. Hence, the encoder and the decoder DPB can comprise a real frame and at least one version of a predicted frame corresponding to the same time (i.e. the same user action). All frames contained in the encoder or decoder DPB can be used as reference frames for temporal prediction. These frames can be identified using the values of the syntax elements input_timing and real_frame conveyed in the frame_timing_sei( ) SEI message associated to these frames.

Until now, the video sequence corresponding to the frames representing the game was encoded using a single layer codec. In a sixth variant of the second embodiment, a multi-layer codec is used. Any multi-layer codec could be used such as for example, SVC which corresponds to the scalable extension of AVC, MVC which corresponds to the multi-view extension of AVC, SHVC which corresponds to the scalable extension of HEVC or any multi-layer extension of VVC.

In the sixth variant, a base layer is used to encode the predicted frames and a second layer is used to encode real frames. The encoding of the layers could be independent (no inter-layer prediction) or the encoding of a real frame t of the second layer could be a combination of intra-layer prediction from available real frames of the second layer and of inter-layer prediction from the predicted frame t of the base layer corresponding temporally to the real frame t. When several versions of a same predicted frame t are generated, each first version of a predicted frame is encoded in a base layer, the $i^{est}$ version of a predicted frame is encoded in a $i^{est}$ layer and the corresponding real frame is encoded in a last layer.

In last video compression standards such as AVC, HEVC and VVC, frame can be identified by their timestamp and/or by a picture order count (POC) which represents the order of encoding/decoding of a frame (which may be different from the display order). POC management may become an issue when several versions of a same frame exist which is the case when a predicted frame and a real frame coexist.

In a seventh variant of the second embodiment wherein the codec described in the standard VVC is used, modifications of the DPB and POC handling is proposed. These modifications mainly intend to allow "updating" a frame by repeating the coding of a particular value of POC. In other words, a same POC value can be used by several frames, for example by a predicted frame and then by a corresponding real frame. To do so, a new syntax element ph_pic_order_update is inserted in the picture header syntax picture_header_structure( ), for example described in document JVET-R2001.

The following example of semantic is associated to the syntax element ph_pic_order_count (in bold):

A VCL NAL unit is the first VCL NAL unit of an AU (and consequently the PU containing the VCL NAL unit is the first PU of the AU) when the VCL NAL unit is the first VCL NAL unit of a picture, determined as specified in clause 7.4.2.4.4 (Order of NAL units and coded pictures and their association to Pus) of JVET-R2001, and one or more of the following conditions are true:

- The value of *nuh_layer_id* of the VCL NAL unit is less than the *nuh_layer_id* of the previous picture in decoding order;
- The value of *ph_pic_order_cnt_lsb* of the VCL NAL unit differs from the *ph_pic_order_cnt_lsb* of the previous picture in decoding order, except when the flag *ph_pic_order_update* is true and the *ph_pic_order_cnt_lsb* is equal to a previously transmitted value;
- *PicOrderCntVal* derived for the VCL NAL unit differs from the *PicOrderCntVal* of the previous picture in decoding order, except when the flag *ph_pic_order_update* is true and the *PicOrderCntVal* is equal to a previous value.

As can be seen from this semantic, the syntax element ph_pic_order_count, when equal to "true" allows two successive frames to use the same POC (represented here by the syntax element PicOrderCntVal).

The following computation is also changed in clause 8.3.1 (decoding process for picture order count) of document JVET-R2001 (in bold):

```
Otherwise, PicOrderCntMsb is derived as follows:
if ( ph_pic_order_update )
if( ( ph_pic_order_cnt_lsb < prevPicOrderCntLsb ) &&
(( prevPicOrderCntLsb − ph_pic_order_cnt_lsb )>=
( MaxPicOrderCntLsb /2)))
   PicOrderCntMsb = prevPicOrderCntMsb + MaxPicOrderCntLsb
else if( ( ph_pic_order_cnt_lsb > prevPicOrderCntLsb ) &&
(( ph_pic_order_cnt_lsb − prevPicOrderCntLsb )>(
MaxPicOrderCntLsb /2)))
   PicOrderCntMsb = prevPicOrderCntMsb − MaxPicOrderCntLsb
else
   PicOrderCntMsb = prevPicOrderCntMsb
else
   PicOrderCntMsb = PicOrderCntMsb( ph_pic_order_cnt_lsb )
```

In the last line, the variable PicOrderCntMsb can take the same value than the one which was used when previously decoding the same ph_pic_order_cnt_lsb.

When the flag ph_pic_order_update is true, at the end of the decoding, the new decoded frame replaces the previously decoded image with the same POC value in the DPB.

FIG. 8 illustrates schematically an example of a third embodiment of a method for reducing latency in a cloud gaming application.

The third embodiment is a combination of the first embodiment of FIG. 5 (with any variant or any combinations of its variants) and of the second embodiment of FIG. 7 (with any variant or any combinations of its variants).

Comparing to FIG. 7, in FIG. 8 Steps 500 and 501 were added after the video decoding step 708.

In the step 501, the processing module 100 of the user game system 2 uses the NN to predict a frame t corresponding to the last action of the user captured by the input device at time t in a step 500.

The prediction performed in step 501 uses as input at least one predicted frame received in step 707 and the information representative of the last action of the user at time t registered in step 500.

In a first variant of the third embodiment, the at least one predicted frame used for the prediction is step 501 is the predicted frame t.

In a second variant of the third embodiment, the at least one predicted frame used for the prediction is step 501 comprises the predicted frame t and at least one of another predicted frame or of a real frame contained in the decoder DPB.

In a third variant of the third embodiment, a user action, called intermediate action, predicted in step 701, corresponds to a time t−x between time t−$\Delta$t and time t. Consequently, the predicted frame is a frame t−x corresponding to said intermediate action. In that case, the at least one predicted frame used for the prediction in step 501 comprises the predicted frame t−x.

Until now, the first, second and third embodiment of a method for reducing latency were described in the context of cloud gaming. These three embodiments could be easily adapted to the context of stand-alone gaming solutions.

FIG. 9 illustrates schematically an example of an embodiment of a method for reducing latency in a stand-alone gaming application.

The method of FIG. 9 corresponds to the method of FIG. 8 but mapped in the stand-alone gaming context. Comparing to the method of FIG. 8, transmission steps, reception steps, DPB management steps, video encoding and video decoding steps were removed. All steps are now executed by the processing module 100 of the user gaming system 2. Other steps remain identical. A similar mapping can be applied to the methods of FIGS. 5 and 7.

Here, assuming that the NN computation is faster than the rendering delay, the network is used to "erase" the rendering delay. Two renderings are done: one for generating a real frame $t-\Delta t$ that can be used either by the loss function to compare a predicted frame and a real frame when the NN is trained on the fly or as an input frame by the NN if the NN uses several input frames and one for generating a predicted frame t corresponding to the action predicted in step 701 that is the only frame required as input of the NN.

We described above a number of embodiments. Features of these embodiments can be provided alone or in any combination. Further, embodiments can include one or more of the following features, devices, or aspects, alone or in any combination, across various claim categories and types:

- A bitstream or signal that includes one or more of the described syntax elements, or variations thereof.
- Creating and/or transmitting and/or receiving and/or decoding a bitstream or signal that includes one or more of the described syntax elements, or variations thereof.
- A cell phone, tablet, game console, server, personal computer, or other electronic device that performs at least one of the embodiments described.
- A cell phone, tablet, game console, server, personal computer or other electronic device that performs at least one of the embodiments described, and that displays (e.g. using a monitor, screen, or other type of display) a resulting image.
- A cell phone, tablet, game console, personal computer or other electronic device that tunes (e.g. using a tuner) a channel to receive a signal including an encoded video stream, and performs at least one of the embodiments described.
- A cell phone, tablet, game console, personal computer or other electronic device that receives (e.g. using an antenna) a signal over the air that includes an encoded video stream, and performs at least one of the embodiments described.
- A server, personal computer or other electronic device that tunes (e.g. using a tuner) a channel to transmit a signal including an encoded video stream, and performs at least one of the embodiments described.
- A server, personal computer or other electronic device that transmits (e.g. using an antenna) a signal over the air that includes an encoded video stream, and performs at least one of the embodiments described.

The invention claimed is:

1. A method for reducing a latency in an interactive application comprising:

obtaining a first frame, the first frame being representative of a first action performed by a user in the interactive application;

obtaining information representative of a second action performed by the user in the interactive application, the second action following the first action; and, predicting a second frame corresponding to the second action from data comprising at least the first frame and the information representative of the second action using a neural network, the neural network being trained in real-time using data representative of frames, user actions and status of the interactive application collected during a current execution of the interactive application.

2. The method according to claim 1 wherein the method further comprises displaying the second frame.

3. The method according to claim 1 wherein the method further comprises obtaining metadata along with the first frame, the metadata being at least representative of a status of the interactive application at a time corresponding to the first action and/or of the first action, the second frame being further predicted from the metadata using the neural network.

4. The method according to claim 3 wherein the metadata representative of a status of the interactive application comprise information representative of the user and/or information representative of dynamic objects and/or of other users in the interactive application.

5. The method according to claim 1 wherein the neural network use parameters:

trained offline using data representative of frames, user actions and status of the interactive application collected during an offline execution of the interactive application; or, initialized at a start of an execution of the interactive application using parameters trained offline using data representative of frames, user actions and status of the interactive application collected during an offline execution of the interactive application and then trained by updating in real-time using data representative of frames, user actions and status of the interactive application collected during the current execution of the interactive application.

6. The method according to claim 5 wherein the training of the parameters of the neural network takes into account a time difference between an occurrence of the first action and the obtaining of the first frame.

7. The method according to claim 6 wherein, when the parameters of the neural network are trained offline, a plurality of sets of parameters are trained, each set of parameters being trained for a different value of offline time difference and wherein, during a current execution of the interactive application, the method comprises selecting the set of parameters of the plurality corresponding to the offline time difference the closest to an information representative of an actual time difference.

8. The method according to claim 1 wherein the training of the parameters of the neural network uses a loss function estimating a difference between the second frame corresponding to the second action predicted by the neural network and a real frame generated by the interactive application corresponding to the same second action and wherein only a subpart of the second frame is displayed, only the displayed subpart being considered by the loss function.

9. The method according to claim 1 wherein the interactive application is a network-based interactive application wherein the interactive application is managed by a remote equipment communicating with a local equipment via a network, the method being executed by the local equipment wherein:

the first action is performed by the user at a first time and registered by the local equipment and an information representative of the first action is transmitted to the remote equipment; and the first frame and/or the metadata are obtained by decoding a portion of a video stream received from the remote equipment.

10. The method according to claim 9 wherein:

the first frame corresponds to a second action of the user at a second time following the first time predicted by the remote equipment from the information representative of the first action and information representative of a status of the interactive application at the first time;

and the method further comprises:

storing a reconstructed version of the first frame in a frame buffer used for temporal prediction of next frames;

receiving from the remote equipment a real frame corresponding to the second time after transmission to the remote equipment of data representative of an action performed by the user at the second time; and, decoding the real frame and replacing the reconstructed version of the predicted frame by a reconstructed version of the real frame in the frame buffer.

11. A device for reducing a latency in an interactive application comprising electronic circuitry adapted for:

obtaining a first frame, the first frame being representative of a first action performed by a user in the interactive application;

obtaining information representative of a second action performed by the user in the interactive application, the second action following the first action; and, predicting a second frame corresponding to the second action from data comprising at least the first frame and the information representative of the second action using a neural network, the neural network being trained in real-time using data representative of frames, user actions and status of the interactive application collected during a current execution of the interactive application.

12. The device according to claim 11 wherein the electronic circuitry is further adapted for controlling a display of the second frame.

13. The device according to claim 11 wherein the electronic circuitry is further adapted for obtaining metadata along with the first frame, the metadata being at least representative of a status of the interactive application at a time corresponding to the first action and/or of the first action, the second frame being further predicted from the metadata using the neural network.

14. The device according to claim 13 wherein the metadata representative of a status of the interactive application comprise information representative of the user and/or information representative of dynamic objects and/or of other users in the interactive application.

15. The device according to claim 11 wherein the neural network use parameters:

trained offline using data representative of frames, user actions and status of the interactive application collected during an offline execution of the interactive application; or, initialized at a start of an execution of the interactive application using parameters trained offline using data representative of frames, user actions and status of the interactive application collected during an offline execution of the interactive application and then trained by updating in real-time using data representative of frames, user actions and status of the interactive application collected during the current execution of the interactive application.

16. The device according to claim 15 wherein the training of the parameters of the neural network takes into account a time difference between an occurrence of the first action and the obtaining of the first frame.

17. The device according to claim 16 wherein, when the parameters of the neural network are trained offline, a plurality of sets of parameters are trained, each set of parameters being trained for a different value of offline time difference and wherein, during a current execution of the interactive application, the electronic circuitry is further adapted for selecting the set of parameters of the plurality corresponding to the offline time difference the closest to an information representative of an actual time difference.

18. The device according to claim 11 wherein the training of the parameters of the neural network uses a loss function estimating a difference between the second frame corresponding to the second action predicted by the neural network and a real frame generated by the interactive application corresponding to the same second action and wherein only a subpart of the second frame is displayed, only the displayed subpart being considered by the loss function.

19. The device according to claim 11 wherein the interactive application is a network-based interactive application wherein the interactive application is managed by a remote equipment communicating with the device via a network, the electronic circuitry being further adapted to:

register the first action, the first action being performed by a user at a first time;

transmit information representative of the first action to the remote equipment; and obtaining the first frame and/or the metadata by decoding a portion of a video stream received from the remote equipment.

20. The device according to claim 19 wherein:

the first frame corresponds to a second action of the user at a second time following the first time predicted by the remote equipment from the information representative of the first action and information representative of a status of the interactive application at the first time;

and the electronic circuitry is further adapted for:

storing a reconstructed version of the first frame in a frame buffer used for temporal prediction of next frames;

receiving from the remote equipment a real frame corresponding to the second time after transmission to the remote equipment of data representative of an action performed by the user at the second time; and, decoding the real frame and replacing the reconstructed version of the predicted frame by a reconstructed version of the real frame in the frame buffer.

* * * * *